(12) United States Patent
Rohlf et al.

(10) Patent No.: US 11,200,280 B2
(45) Date of Patent: Dec. 14, 2021

(54) SYSTEM AND METHOD FOR STORING AND RETRIEVING GEOSPATIAL DATA

(71) Applicant: Google Inc., Mountain View, CA (US)

(72) Inventors: John H. Rohlf, Truckee, CA (US); Matthew Dexter Hancher, San Francisco, CA (US)

(73) Assignee: Google LLC, Mountain View, CA (US)

( * ) Notice: Subject to any disclaimer, the term of this patent is extended or adjusted under 35 U.S.C. 154(b) by 952 days.

(21) Appl. No.: 15/667,869

(22) Filed: Aug. 3, 2017

(65) Prior Publication Data

US 2017/0329801 A1 Nov. 16, 2017

Related U.S. Application Data

(62) Division of application No. 14/134,128, filed on Dec. 19, 2013, now Pat. No. 9,734,260, which is a division
(Continued)

(51) Int. Cl.
*G06F 16/901* (2019.01)
*G06F 16/29* (2019.01)
(Continued)

(52) U.S. Cl.
CPC ...... *G06F 16/9027* (2019.01); *G06F 16/2246* (2019.01); *G06F 16/29* (2019.01); *G06T 17/05* (2013.01); *G06F 16/83* (2019.01)

(58) Field of Classification Search
None
See application file for complete search history.

(56) References Cited

U.S. PATENT DOCUMENTS

| 5,448,486 A | 9/1995 | Watland |
| 6,684,219 B1 * | 1/2004 | Shaw ............... G06F 16/289 |

(Continued)

FOREIGN PATENT DOCUMENTS

| CN | 101145245 | 3/2008 |
| CN | 101599183 | 12/2009 |
| WO | WO 2007/146967 | 12/2007 |

OTHER PUBLICATIONS

Szalay et al. "Indexing the Sphere with the Hierarchical Triangular Mesh". Microsoft Technical Report MSR-TR-2005-123. Published Aug. 2005. URL Link: <https://arxiv.org/ftp/cs/papers/0701/0701164.pdf>. Accessed Feb. 2020. (Year: 2005).*

(Continued)

*Primary Examiner* — Irene Baker
(74) *Attorney, Agent, or Firm* — Dority & Manning, P.A.

(57) ABSTRACT

Systems and methods for storing and retrieving geospatial data in a geographic information system are provided. Geospatial data can be spatially partitioned along axes of a spherical coordinate system associated with a virtual globe or other spheroid into a plurality of discrete geospatial volumes pursuant to a hierarchical spatial partitioning scheme. For instance, geospatial data can be spatially partitioned into geospatial volumes along surfaces of constant latitude, longitude, and altitude defined by the spherical coordinate system. The discrete geospatial volumes can be stored as nodes in a hierarchical tree data structure. Additional methods are provided for portioning geospatial objects, such as tiles or discrete geospatial volumes, in tritree to reduce polar distortions.

20 Claims, 12 Drawing Sheets

Related U.S. Application Data of application No. 13/529,433, filed on Jun. 21, 2012, now Pat. No. 8,650,220.

(60) Provisional application No. 61/655,919, filed on Jun. 5, 2012.

(51) Int. Cl.
*G06F 16/22* (2019.01)
*G06T 17/05* (2011.01)
*G06F 16/83* (2019.01)

(56) References Cited

U.S. PATENT DOCUMENTS

| | | | |
|---|---|---|---|
| 7,353,114 B1 | 4/2008 | Rohlf et al. | |
| 7,526,718 B2 | 4/2009 | Samadani et al. | |
| 7,643,673 B2 | 1/2010 | Rohlf et al. | |
| 7,746,343 B1* | 6/2010 | Charaniya | G06F 16/2428 |
| | | | 345/428 |
| 7,821,448 B2 | 10/2010 | Mahapatra et al. | |
| 7,872,647 B2 | 1/2011 | Mayer et al. | |
| 7,933,395 B1 | 4/2011 | Bailly et al. | |
| 8,018,458 B2 | 9/2011 | Peterson | |
| 8,384,715 B2 | 2/2013 | Loop et al. | |
| 8,417,708 B2 | 4/2013 | Chidlovskii | |
| 8,928,661 B2 | 1/2015 | Grenfell | |
| 2003/0187819 A1* | 10/2003 | Gutierrez | G06F 16/29 |
| 2003/0187867 A1* | 10/2003 | Smartt | G06F 16/2264 |
| 2003/0227455 A1* | 12/2003 | Lake | G06T 17/005 |
| | | | 345/421 |
| 2004/0024779 A1* | 2/2004 | Perry | G06F 16/9027 |
| 2004/0064958 A1* | 4/2004 | Segur | G01C 21/20 |
| | | | 33/1 CC |
| 2004/0117358 A1* | 6/2004 | von Kaenel | G06Q 40/08 |
| 2005/0015216 A1* | 1/2005 | V. Kothuri | G06F 16/2264 |
| | | | 702/158 |
| 2005/0128210 A1 | 6/2005 | Berger | |
| 2006/0109267 A1* | 5/2006 | Rybacki | G06T 17/05 |
| | | | 345/423 |
| 2007/0040833 A1* | 2/2007 | Buyanovski | G06T 15/06 |
| | | | 345/426 |
| 2007/0058865 A1 | 3/2007 | Li et al. | |
| 2007/0168370 A1* | 7/2007 | Hardy | G06F 16/29 |
| 2008/0174482 A1 | 7/2008 | Watson et al. | |
| 2008/0183730 A1* | 7/2008 | Enga | G06F 16/29 |
| 2008/0238919 A1* | 10/2008 | Pack | G06T 15/04 |
| | | | 345/420 |
| 2009/0136103 A1 | 5/2009 | Sonka et al. | |
| 2009/0259976 A1 | 10/2009 | Varadhan et al. | |
| 2010/0054527 A1 | 3/2010 | Kirmse et al. | |
| 2010/0205181 A1* | 8/2010 | Chidlovskii | G06F 16/29 |
| | | | 707/741 |
| 2011/0093803 A1 | 4/2011 | Ohazama et al. | |
| 2011/0316854 A1* | 12/2011 | Vandrovec | G06T 17/005 |
| | | | 345/420 |
| 2012/0116678 A1 | 5/2012 | Mayhew et al. | |

OTHER PUBLICATIONS

Lv et al. "Spatial Indexing of Global Geographic Data with HTM". 2010 18th International Conference on Geoinformatics, pp. 1-6. Published Jun. 1, 2010. Digital Object Identifier (DOI): 10.1109/GEOINFORMATICS.2010.5567967. URL Link: <https://ieeexplore.ieee.org/document/5567967>. Accessed Feb. 2020. (Year: 2010).*

Borgefors "A Hierarchical 'Square' Tessellation of the Sphere", Pattern Recognition Letters, vol. 13, No. 3, Mar. 1, 1992, pp. 183-188.

Chen, "A Spherical Model for Navigation and Spatial Reasoning", Proceedings of the International Conference on Robotics and Automation, vol. 13, Cincinnati, Ohio, May 13-18, 1990, pp. 776-781.

Cheng et al., "A New Storage Architecture Based on Global Subdivision Theory for Spatial Data", 18th International Conference on Geoinformatics, Beijing, China, Jun. 18-20, 2010, pp. 1-6.

China Search Report for corresponding China Application No. 20138002988.6, dated Aug. 3, 2015, 2 pages.

Fekete, "Rendering and Managing Spherical Data with Sphere Quadtrees", Proceedings of the Conference on Visualization, Los Alamitos, California, Oct. 23, 1990, pp. 176-186.

GitHub, inc., NASA Vision Workbench, Copyright 2006, retrieved on May 11, 2017—6 pages https://github.com/visionworkbench/visionworkbench/bob/master.src.vw/Mosaic/KMLQuadTreeConfig.cc#L315.

Kooima et al., "Planetary-Scale Terrain Composition", IEEE Transactions on Visualization and Computer Graphics, vol. 15, No. 5, Sep. 1, 2009, pp. 719-733.

Museth et al., "TetSplat: Real-Time Rendering and Volume Clipping of Large Unstructured Tetrahedral Meshes", IEEE Visualization, Austin, Texas, Oct. 10-15, 2004, pp. 433-440.

Wan et al., "Isocube: Exploiting the Cubemap Hardware", IEEE Transactions on Visualization and Computer Graphics, vol. 13, No. 4, Jul. 1, 2007, 720-731.

Wartell et al., "Efficient Ray Intersection for Visualization and Navigation of Global Terrain Using Spheroidal Height-Augmented Quadtrees", Proceedings of the Joint Eurographics and IEEE TCVG Symposium on Visualization, May 26, 1999, pp. 213-223.

Willie, "A Structured Tri-Tree Search Method for Generation of Optimal Unstructured Finite Element Grids in Two and Three Dimensions", International Journal for Numerical Methods in Fluids, vol. 14, No. 7, Apr. 15, 1992, pp. 861-881.

* cited by examiner

|  |  |  |  |  |  |  |  |
|---|---|---|---|---|---|---|---|
| $A_{2,2}$ |||| $C_{2,2}$ ||||
| $A_{2,0}$ || $B_{2,1}$ || $C_{2,0}$ || $C_{2,1}$ ||
| $A_{0,2}$ | $A_{0,3}$ | $A_{1,2}$ | $A_{1,3}$ | $B_{0,2}$ | $B_{0,3}$ | $B_{1,2}$ | $A_{1,3}$ |
| $A_{0,0}$ | $A_{0,1}$ | $A_{1,0}$ | $A_{1,1}$ | $B_{0,0}$ | $B_{0,1}$ | $B_{1,0}$ | $B_{1,1}$ |
| $C_{2,2}$ | $C_{2,3}$ | $C_{3,2}$ | $C_{3,3}$ | $D_{2,2}$ | $D_{2,3}$ | $D_{3,2}$ | $D_{3,3}$ |
| $C_{2,0}$ | $C_{2,1}$ | $C_{3,0}$ | $C_{3,1}$ | $D_{2,0}$ | $D_{2,1}$ | $D_{3,0}$ | $D_{3,1}$ |
| $C_{0,2}$ || $C_{0,3}$ || $D_{0,1}$ || $D_{0,3}$ ||
| $C_{0,0}$ |||| $D_{0,0}$ ||||

← POLE (top)
← POLE (bottom)

| A₂,₂ | | | B₂,₂ | | | | C₂,₂ | | | | D₂,₂ | | | ← POLE |
|---|---|---|---|---|---|---|---|---|---|---|---|---|---|---|
| A₂,₀ | | A₂,₁ | B₂,₀ | | B₂,₁ | | C₂,₀ | | C₂,₁ | | D₂,₀ | | D₂,₁ | |
| A₀,₂ | A₀,₃ | A₁,₂ | A₁,₃ | B₀,₂ | B₀,₃ | B₁,₂ | B₁,₃ | C₀,₂ | C₀,₃ | C₁,₂ | C₁,₃ | D₀,₂ | D₀,₃ | D₁,₁ | C₁,₂ |
| A₀,₀ | A₀,₁ | A₁,₀ | A₁,₁ | B₀,₀ | B₀,₁ | B₁,₀ | B₁,₁ | C₀,₀ | C₀,₁ | C₁,₀ | C₁,₁ | D₀,₀ | D₀,₁ | D₁,₀ | D₁,₁ |
| E₂,₂ | E₂,₃ | E₃,₂ | E₃,₃ | F₂,₂ | F₂,₃ | F₃,₂ | F₃,₃ | G₂,₂ | G₂,₃ | G₃,₂ | G₂,₃ | H₂,₂ | H₂,₃ | H₃,₂ | H₃,₃ |
| E₂,₀ | E₂,₁ | E₃,₀ | E₃,₁ | F₂,₀ | F₂,₁ | F₃,₀ | F₃,₁ | G₂,₀ | G₂,₁ | G₃,₀ | G₃,₁ | H₂,₀ | H₂,₁ | H₃,₀ | H₃,₁ |
| E₀,₂ | | E₀,₃ | F₀,₂ | | F₀,₃ | | G₀,₂ | | G₀,₃ | | H₀,₂ | | H₀,₃ | |
| E₀,₀ | | | F₀,₀ | | | | G₀,₀ | | | | H₀,₀ | | | ← POLE |

1

SYSTEM AND METHOD FOR STORING AND RETRIEVING GEOSPATIAL DATA

PRIORITY CLAIM

The present application is a divisional of and claims priority to co-pending U.S. application Ser. No. 14/134,128, filed Dec. 19, 2013, which is a divisional of and claims priority to U.S. application Ser. No. 13/529,433 filed Jun. 21, 2012 (issued as U.S. Pat. No. 8,650,220 on Feb. 11, 2014), which claims the benefit of priority of U.S. Provisional Patent Application Ser. No. 61/655,919 filed Jun. 5, 2012, which are incorporated herein by reference for all purposes.

FIELD

The present disclosure relates generally to geographic information systems and more particularly to the organization and processing of geospatial data in a geographic information system.

BACKGROUND

Geographic information systems provide for the archiving, retrieving, and manipulating of data that has been stored and indexed according to geographic coordinates of its elements. A geographic information system generally includes a variety of data types, including imagery, maps, tables, vector data (e.g. vector representations of roads, parcels, buildings, etc.) and other data. Improvements in computer processing power and broadband technology have led to the development of interactive geographic information systems that allow for the navigating and displaying of geographic imagery. Some interactive geographic information systems provide a user interface with navigation controls for navigating cities, neighborhoods, geographic areas and other terrain in two or three dimensions. The navigation controls can enable users to tilt, pan, rotate, zoom, and activate views of terrain, buildings, and other objects from different perspectives at a geographic area of interest. An example of an interactive geographic information system for navigating geographic imagery is the Google Earth™ virtual globe application developed by Google Inc.

Due to the massive volume of data in certain geographic information systems, the data can be spatially partitioned into manageable pieces to facilitate processing of the data. For instance, in an interactive geographic information system for displaying and navigating imagery, the geospatially organized data can be spatially partitioned into manageable pieces for fetching and rendering data associated only with the visible portion of the geographic area in the user interface for viewing and navigating the geographic imagery. The geospatially organized data can be arranged in a data structure, such as a quadtree or octree data structure, to facilitate fetching, culling, and level of detail management of the data.

Typical spatial partitioning schemes, such as spatial partitioning schemes used in three-dimensional graphics applications in gaming, spatially partition data into two or three dimensional Cartesian spaces, i.e. boxes in a coordinate system having an x-axis, y-axis, and a z-axis. For a large geographic information system, such as a virtual globe application providing for the rendering of an entire planet or other spheriod (e.g. the Earth, Moon, Mars, etc.), the source data is often available in a spherical projection, i.e. latitude, longitude, and altitude coordinates. Mapping the source data in these cases into a Cartesian spatial partitioning scheme can be cumbersome and non-trivial.

In addition, existing spatial partitioning schemes associated with spherical or near spherical objects, such as a planet, geoid, or other spheroid, can result in distortions caused by the natural compression of longitude in geographic areas proximate the poles of the spherical or near spherical object. For instance, geographic information systems that spatially partition data using a flat latitude/longitude equirectangular projection of a planet (e.g. a plate carree) to map an image to the spherical surface of the planet can result in tessellation problems in areas adjacent the poles of the planet. For instance, the tessellation of the Earth into a quadtree data structure with each quad node being square in terms of latitude and longitude can result in compression of the quad node at geographic locations adjacent the poles. Indeed quad nodes that touch the poles can become triangles, resulting in reduced image quality when viewing imagery of the poles in the interactive geographic information system.

SUMMARY

Aspects and advantages of the invention will be set forth in part in the following description, or may be obvious from the description, or may be learned through practice of the invention.

One exemplary aspect of the present disclosure is directed to a computer-implemented method of storing geospatial data in a geographic information system associated with a spheroid. The method includes spatially partitioning geospatial data into a plurality of discrete geospatial volumes along surfaces of constant altitude defined in a spherical coordinate system relative to the spheroid pursuant to a hierarchical spatial partitioning scheme; and storing geospatial data associated with each of the plurality of discrete geospatial volumes in a memory as a node in a hierarchical tree data structure.

Another exemplary aspect of the present disclosure is a computer-readable medium encoded with a hierarchical tree data structure for geospatial data in a geographic information system associated with a globe. The hierarchical tree data structure includes a plurality of nodes. The plurality of nodes includes a parent node associated with a geospatial data volume defined in spherical coordinates relative to the globe. The plurality of nodes further includes a plurality of first descendant nodes. Each of the first descendent nodes is a child node relative to the parent node in the hierarchical tree data structure. Each of the first descendant nodes is associated with one of a plurality of first geospatial subvolumes obtained by spatially partitioning the geospatial volume along a surface of constant altitude into a plurality of strata.

Yet another exemplary aspect of the present disclosure is directed to a computer-implemented method of storing geospatial data in a geographic information system for a spheroid. The method includes storing geospatial data associated with a polar geospatial object in a memory as at least a part of a payload of a parent node in a hierarchical tree data structure. The polar geospatial object is associated with a geospatial area located adjacent to a pole of the globe. The method further includes spatially partitioning the polar geospatial object in tritree to obtain a first set of descendant geospatial objects. The first set of descendant geospatial objects includes first, second, and third child geospatial objects. The first child geospatial object is associated with a geospatial area located adjacent to the pole of the spheroid and spans the same longitudinal extent of the polar geospatial object (e.g. its parent geospatial object). The method further includes storing the first, second, and third child geospatial objects in one of a plurality of child nodes of the parent node in the hierarchical tree data structure. The child nodes are selected to preserve parent-child hierarchy among geospatial objects across three or more node levels in the hierarchical tree data structure.

Other exemplary aspects of the present disclosure are directed to systems, apparatus, computer-readable media, devices, and user interfaces for the organization and processing of data in a geographic information system, such as a virtual globe application or other geographic information system associated with a planet, geoid, or other spheroid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
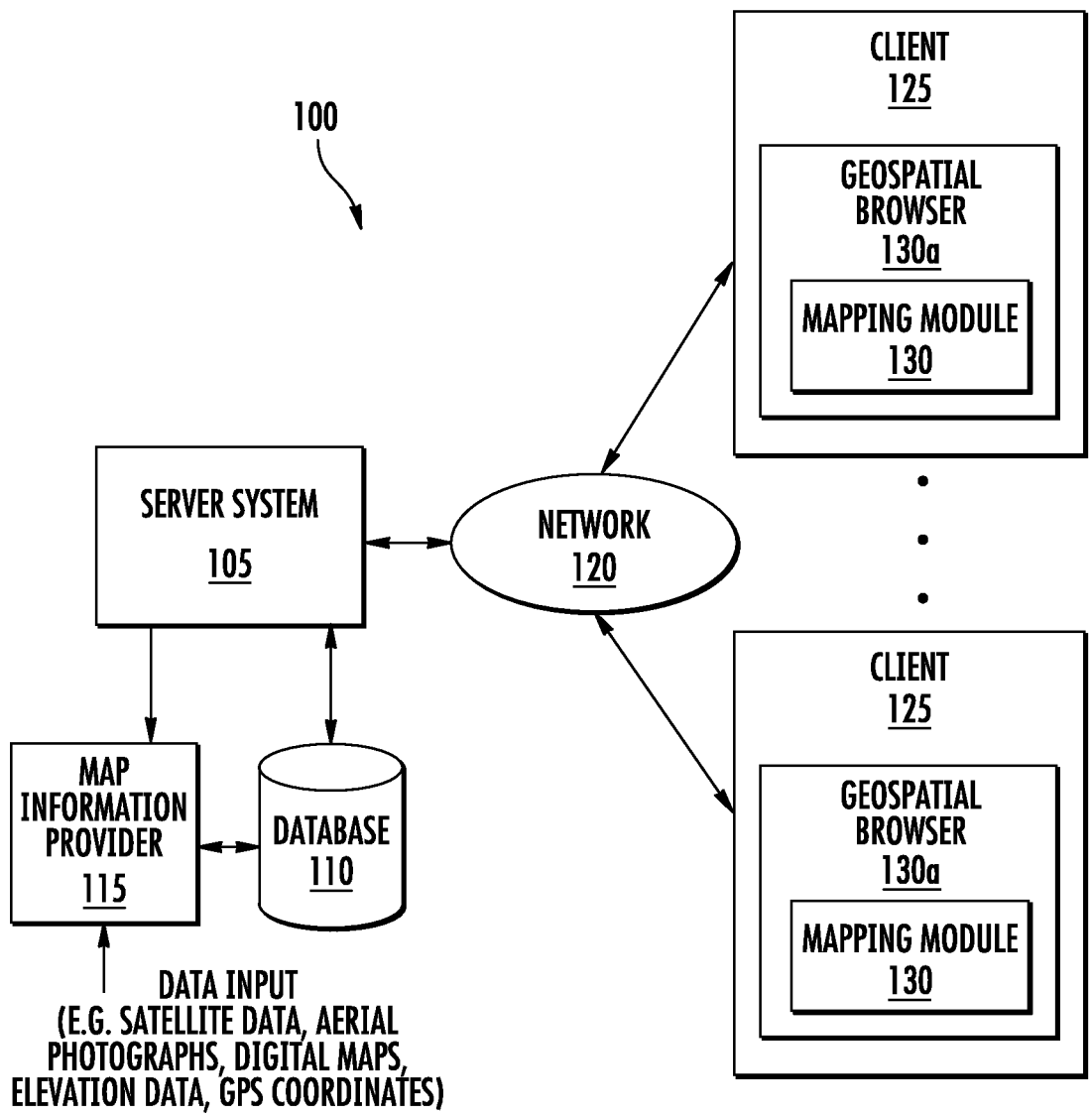
FIG. 1 depicts a computer-based system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to systems and methods for organizing and processing geospatial data in a geographic information system, such as geographic information for a virtual globe, planet, geoid, or other spheroid. While the present disclosure is discussed with reference to a virtual globe, those of ordinary skill in the art, using the disclosures provided herein, should understand that the subject matter of the present disclosure is equally applicable to any spheroid. A spheroid can be any object, volume, or space having a spheroidal, spherical, or near spherical shape. For instance, the spheroid can be a planet, a geoid, a globe, a celestial object, or other spheroidal, spherical, or near spherical object.

As used herein, the term "geospatial data" refers to data that is associated with specific coordinates used to associate the data within a space, such as latitude, longitude, and altitude coordinates. According to aspects of the present disclosure, geospatial data is spatially partitioned into a plurality of discrete three-dimensional segments that can be organized and retrieved to facilitate the presentation of data in the geographic information system. As used herein, the term "spatial partitioning" refers to dividing a space into distinct subsets. For instance, geospatial data for a three-dimensional space can be spatially partitioned into a plurality of discrete geospatial volumes.

Each discrete geospatial volume can represent a section of geospatial data within the space defined by the discrete geospatial volume, such as geographic imagery data, data used to render three-dimensional models of buildings and other objects, metadata, and other geospatial data. Each of the discrete geospatial volumes can have particular geographic coordinates (e.g. latitude, longitude, and altitude) and a particular resolution and/or level of detail. The resolution and/or level of detail of the discrete geospatial volume can be implicitly defined by the spatial extent of the discrete geospatial volume. The discrete geospatial volumes can be indexed and stored in a memory for later processing and retrieval.

More particular aspects of the present disclosure are directed to the three-dimensional spatial partitioning of geospatial data associated with a spheroid into a plurality of discrete geospatial volumes along axes defined in a spherical coordinate system relative to the spheroid pursuant to a hierarchical spatial partitioning scheme (i.e. a spatial partitioning scheme that provides for the spatial recursive partitioning of geospatial data into discrete segments and subsegments according to a set of partitioning rules). In the hierarchical spatial partitioning scheme, geospatial data for a virtual globe or other spheroid can be spatially partitioned into a plurality of discrete geospatial volumes along surfaces of constant latitude, longitude, and altitude defined in a spherical coordinate system associated with the virtual globe or other spheroid. In one example, the existing quadtree tessellation of a virtual globe or other spheroid can be modified to include spatial partitioning along an altitude axis into a plurality of strata such that the geospatial data is partitioned into a plurality of discrete three-dimensional geospatial volumes.

The hierarchical spatial partitioning scheme can provide for the further sub-division of each geospatial volume into yet further discrete geospatial volumes as the partitioning scheme progresses through different levels in the hierarchy. For instance, the hierarchical spatial partitioning scheme can be in the form of a spherical octree and can be accomplished by recursively subdividing the discrete geospatial volumes along latitude, longitude, and altitude axes at each level in the hierarchical spatial partitioning scheme into discrete geospatial sub-volumes. The spatial portioning scheme can provide for the partitioning of the geospatial volumes into discrete sub-volumes that are roughly equal in volume at a given level in the hierarchy and such that the discrete geospatial volumes at each level in the hierarchy are approximately cubic in Cartesian space, i.e. each edge of the geospatial volume is roughly equal in length.

In one example, each discrete geospatial volume can be subdivided in half into eight sub-volumes or octants along surfaces of constant longitude, latitude, and altitude at each level in the hierarchical spatial partitioning scheme. In this example, each level in the spatial partitioning hierarchy can include approximately $2^{3n}$ discrete geospatial volumes, with n being the level in the spatial partitioning hierarchy. For instance, level 0 in the spatial partitioning hierarchy can include 1 discrete geospatial volume, which can encompass an entire globe or other spheroid. Level 1 in the spatial partitioning hierarchy can include 8 discrete geospatial volumes. Level 2 can include 64 discrete geospatial volumes. Level 3 can include 512 discrete geospatial volumes and so forth.

The geospatial data represented in each of the discrete geospatial volumes can be stored or indexed in a memory as payloads of nodes in a hierarchical tree data structure. The hierarchical tree data structure can include a plurality of node levels configured in a parent-child relationship. For instance, parent nodes in a first node level can include references to a plurality of child or descendant nodes in a second node level. Each of the child or descendant nodes in the second node level can include references to their own child or descendant nodes in a third node level, and so on. Geospatial data represented by the geospatial volumes at each hierarchical level in the hierarchical spatial partitioning scheme can be associated with nodes at a particular node level in the hierarchical tree data structure.

In a particular implementation, geospatial data partitioned according to spatial partitioning schemes according to exemplary aspects of the present disclosure can be associated with individual nodes in the hierarchical tree data structure. Each node in the hierarchical tree data structure can include a payload having geospatial data corresponding to a discrete geospatial volume having boundaries defined by axes in a spherical coordinate system, such as along surfaces of constant latitude, longitude, and altitude. Each node can include references to up to eight child or descendant nodes.

Each child or descendant node can be associated with one of a plurality of discrete geospatial sub-volumes obtained by spatially partitioning the geospatial volume corresponding to its parent node. The discrete geospatial sub-volumes can be obtained by spatially partitioning the geospatial volume in half along surfaces of constant latitude, longitude, and altitude into octants to obtain eight sub-volumes of approximately equal volume (in Cartesian coordinates). The eight child or descendant nodes can each have a payload of geospatial data corresponding to one of the eight sub-volumes. Each of the eight child or descendant nodes can further include references to up to eight child or descendant nodes of their own. These child or descendant nodes can correspond to further sub-volumes in the spatial partitioning hierarchy and so forth.

The hierarchical tree data structure can facilitate navigation, culling, and level of detail management in an interactive geographic information system, such as a virtual globe application. In particular, a computing device executing instructions to display geographic imagery and other geospatial data for the virtual globe or other spheroid can traverse the hierarchical tree data structure to identify nodes having payloads of drawable geospatial data relative to the desired view of the virtual globe. As a user pans across the virtual globe, different geospatial volumes at the one or more node levels in the hierarchical tree data structure can be displayed to the user. Tilted views and views of mountainous terrain can require the display of geospatial volumes across multiple node levels in the hierarchical tree data structure. Skirts can be rendered between discrete geospatial volumes, for instance, to hide cracks between adjacent volumes of differing levels of detail. As the user zooms in and out, geospatial volumes at different node levels in the hierarchical tree data structure can be provided to the user. For example, a first geospatial volume corresponding to a parent node in the hierarchical tree data structure and having geospatial data at a coarser level of detail can be replaced with child geospatial volumes at a finer level of detail and corresponding to child nodes in the hierarchical tree data structure as the user zooms in or transitions to a closer camera distance in the virtual globe application.

Special partitioning rules can be provided in the hierarchical spatial partitioning scheme for geospatial locations proximate the poles. The hierarchical spatial partitioning scheme can provide for the modified quadtree tessellation of geospatial objects, such as two-dimensional "tiles" or three-dimensional discrete geospatial volumes, along axes of latitude and longitude at areas proximate the poles. Instead of partitioning a geospatial object located adjacent the pole into quadrants as provided in a typical quadtree tessellation, the areas proximate the poles can be spatially partitioned in a tritree.

In tritree spatial partitioning, each geospatial object that is located adjacent the pole is subdivided into three child geospatial objects—the usual two child geospatial objects located away from the pole but only one child geospatial object located adjacent the pole. The child geospatial object located adjacent the pole has the same longitudinal extent of its parent and spans the combined longitudinal extent of the child geospatial objects located away from the pole. This can reduce longitudinal compression and improve the aspect ratio of geospatial objects located adjacent the poles.

While tritree partitioning is discussed above with reference to two-dimensional spatial partitioning of a geospatial object, it is equally applicable in a three-dimensional spatial partitioning of geospatial data, such as spatial partitioning pursuant to the spherical octree hierarchical spatial partitioning scheme according to exemplary aspects of the present disclosure. In a three-dimensional tritree partitioning scheme, a geospatial volume located adjacent the pole is partitioned into six child geospatial volumes—two child geospatial volumes located adjacent the pole and four geospatial volumes located away from the pole. The child geospatial volumes located adjacent the pole have the same longitudinal extent as their parent geospatial volumes and the combined longitudinal extent of the four geospatial volumes located away from the pole.

Polar geospatial objects can be indexed in a typical quadtree (or other hierarchical tree, such as an octree) data structure to preserve parent-child hierarchy among polar geospatial objects. Instead of storing polar geospatial objects in nodes corresponding to a particular geospatial location, all child geospatial objects of a polar geospatial object can be stored in child nodes relative to the polar geospatial object. This results in a dense subtree descending from each of the coarser level polar geospatial objects in the hierarchy and can preserve parent-child relationships among polar geospatial objects across three or more node levels in the hierarchical tree data structure.

The hierarchical spatial partitioning scheme according to aspects of the present disclosure can have the technical effect of providing for improved organization of geospatial data into geospatial volumes at each level of the hierarchy that avoid polar distortions and more efficiently support three dimensional data in a geographic information system for a virtual globe or other spheroid. For instance, spatially partitioning geospatial data into discrete geographic volumes along axes defined by a spherical coordinate system provides for the intuitive association of geospatial data for a virtual globe or other spheroid. Such geospatial data is often defined in spherical coordinates (e.g. latitude, longitude, and altitude) and can be easily translated into discrete geospatial volumes partitioned pursuant to a spherical coordinate system associated with the globe or other spheroid.

The partitioning scheme also supports data representing three dimensional objects such as tall buildings and/or mountains in a virtual globe application. Indeed, because data is spatially partitioned along an altitudinal axis running normal to the surface of the virtual globe or spheroid, tall buildings and/or other objects can be sliced vertically. This is in directed contrast to spatial partitioning schemes based on Cartesian coordinate systems which can provide for the arbitrary slicing of tall buildings and other three-dimensional objects at random angles depending on the location of the building or other three-dimensional object.

In addition, the spatial partitioning scheme is readily compatible with existing two dimensional partitioning schemes, such as existing quadtree tessellation schemes that partition geospatial data by latitude and longitude. This can allow for increased compatibility between geospatial data objects organized pursuant to the three dimensional spatial partitioning scheme according to aspects of the present disclosure and geospatial data objects tessellated in quadtree.

Exemplary System Architecture

Exemplary computer-based systems and methods for organizing and processing geospatial data according to the exemplary embodiments of the present disclosure will now be set forth. The present subject matter will be discussed with reference to a geographic information system allowing a user to navigate geographic imagery, such as the Google Earth™ virtual globe application developed by Google Inc.

Those of ordinary skill in the art, using the disclosures provided herein, should understand that the present disclosure is equally applicable to other suitable geographic information systems, such as any geographic information system for a planet, spheroid, geoid or body having a spheroid shape. In addition, the inherent flexibility of computer-based systems allows for a great variety of possible configurations, combinations, and divisions of tasks and functionality between and among the components. For instance, the systems and methods for organizing geospatial data discussed herein can be implemented using a single computing device or across multiple computing devices.

FIG. 1 illustrates an exemplary computer-based geographic information system 100 configured in accordance with an embodiment of the present invention. The geographic information system 100 provides for the archiving, retrieving, and manipulation of geospatial data that has been indexed and stored according to geographic coordinates, such as latitude, longitude, and altitude coordinates, associated with the geospatial data. The system 100 can combine satellite imagery, photographs, maps, models, and other geographic data, and Internet search capability so as to enable a user to view imagery of the planet (e.g. as a portion of a virtual globe) or other spheroid and related geographic information (e.g., locales such as islands and cities; and points of interest such as local restaurants, hospitals, parks, hotels, and schools). The system further allows the user to conduct local searches, get travel directions to a location or between two locations. The user can virtually fly from space (e.g., some vantage point above the Earth) to and around an entered target address or location, such as a neighborhood or other area of interest. Results can be displayed in a three-dimensional representation of the area of interest. The user can pan, tilt, and rotate the view to see three-dimensional terrain and buildings.

The user can also annotate maps, and/or enable data layers to show, for example, parks, schools, hospitals, airports, shopping, and other points of interest or locales. The user can also layer multiple searches, save results to folders, and share search results and maps with others. In addition, a data exchange format referred to herein as KML (Keyhole Markup Language) enables the user to share useful annotations and view thousands of data points created by other system users. An exemplary graphical user interface allowing the user to interact with the system will be discussed with reference to FIG. 2.

Referring to FIG. 1, the system includes a client-server architecture, where the server-side communicates with one or more clients 125 via a network 120. Although two clients 125 are illustrated in FIG. 1, any number of clients 125 can be connected to the server-side over the network 120. The server-side includes a server system 105, an image database 110, and a map information provider 115. On the client-side, each client 125 includes a mapping module 130 that operates as a geospatial browser 130*a* (or other suitable viewer), so as to provide the user with an interface to the system. In one embodiment, at least some of the mapping modules 130 of the clients 125 further include development modules that end-users can use to generate data files describing particular presentations of data. In addition, the system may further include one or more third-party content servers.

The server system 105 can be any computing device and can include a processor and a memory. The memory can store instructions which cause the processor to perform operations. The server system 105 is in communication with the database 110. The database can store geospatial data to be served or provided to the client 125 over the network 120.

The geospatial data can be indexed pursuant to a hierarchical spatial partitioning scheme according to exemplary aspects of the present disclosure. The database 110 can include image data (e.g., digital maps, satellite images, aerial photographs, street-level photographs, synthetic models, etc.), non-image data such as tabular data (e.g., digital yellow and white pages), and map layer data (e.g., database of diners, restaurants, museums, and/or schools; databases of seismic activity; database of national monuments; etc.). The data can be stored in database 110 or in some other storage facility accessible to server system 105. The database 110 (and others, if applicable) is populated (e.g., offline or in real-time) by the server system 105.

The map information provider 115 provides server system 105 with map information (e.g., satellite data, street-level photographs, aerial photographs, digital maps, elevation data, longitude/latitude data, GPS coordinates). The provided map information can be collected, for example, as a function of the server system 105 (e.g., map information provider 115 is a database of map information collected by the server system 105). Alternatively, or in addition, various third party map data services can be used to provide map information to server system 105. All such map internal/external information sources are generally represented by map information provider 115.

In any case, the server system 105 receives requests for map information, and responds to those requests, via the network 120. The map information provider 115 can also be further configured to respond directly to user requests for geographic data. In one embodiment, the server system 105 encodes the map information in one or more data files and provides the files to the requestor.

Note that other modules may be included in the system, and that illustrated modules may be rearranged. For instance, the database 110 can be integrated into the server system 105. Also, the map information provider 115 can be integrated into the server system 105. Other configurations will be apparent in light of this disclosure, and the present invention is not intended to be limited to any particular one. Any number of modules can be programmed or otherwise configured to carry out the server-side functionality described herein.

A client 125 on which the mapping module 130 runs can be, for example, a computing device having a processor and a memory, such as a desktop or laptop computer. Alternatively, a client 125 can be a wireless device, such as a personal digital assistant (PDA), smart phone, tablet, a navigation system located in a vehicle, a handheld GPS system, or other such devices/systems. In short, the client 125 can be any computer, device, or system that can execute the mapping module 130, and allows the user to interact with the server system 105 (e.g., requesting maps, driving directions, and/or data searches, and then receiving data files in response). In the embodiment shown, the mapping module 130 executes or otherwise runs as geospatial browser 130a.

The server system 105 can be implemented with conventional or custom technology. Numerous known server architectures and functionalities can be used to implement a geographic information system server. The server system 105 may include one or more servers operating under a load balancing scheme, with each server (or a combination of servers) configured to respond to and interact with clients via the network 120.

In general, when the user enters a search query (e.g., via the geospatial browser 130a presented by the client-side mapping module 130), it is put into a request and sent to the server system 105 via the network 120. The server system 105 then determines what the search query is for, and responds with the appropriate data from various sub-systems, such as geo-coders, routing engines, and local search indexes, in a format that the requesting client 125 can use to present the data to the user (e.g., via the geospatial browser 130a).

In addition to any conventional functionality, the server system 105 is further configured to interact with the mapping module 130, as will be apparent in light of this disclosure. In one embodiment, the server system 105 responds to the requesting client 125 by encoding data responsive to the request into one or more data files and providing the files to the client.

The network 120 can be any type of communications network, such as a local area network (e.g., intranet), wide area network (e.g., Internet), or some combination thereof. Alternatively, the network 120 can be a direct connection between a client 125 and the server system 105. In general, communication between the server system 105 and a client 125 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Used in conjunction with the server system 105, the geospatial browser 130a interface provided by the mapping module 130 provides an interactive geographic information system that serves maps and data over the network 120. The system allows users to visualize, select, annotate, and explore geographic information all over the world or in a particular region, city, town, or other locale.

Exemplary User Interface

Figure 2:
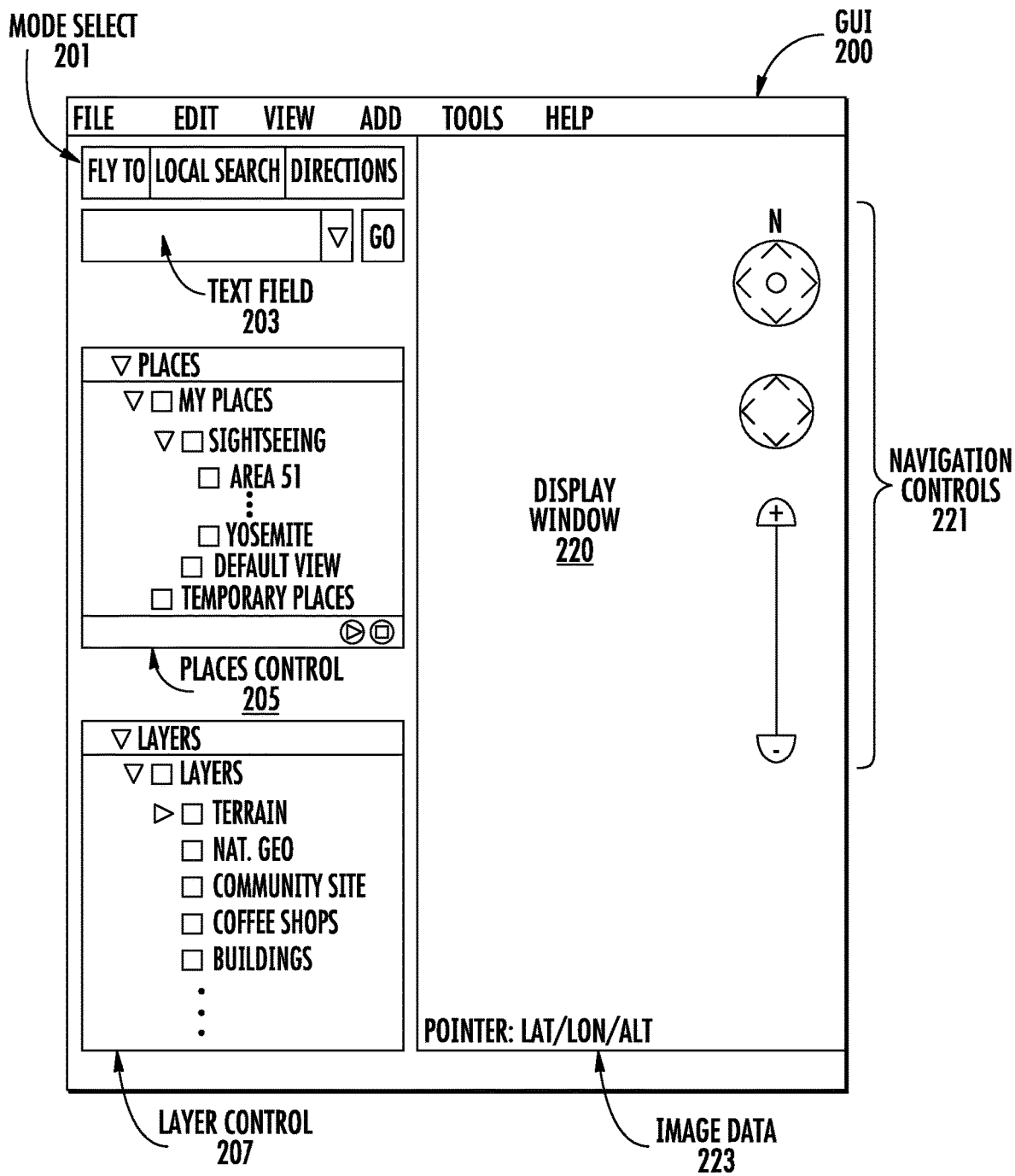
FIG. 2 depicts a graphical user interface for an interactive imaging system according to an exemplary embodiment of the present disclosure.

FIG. 2 illustrates one particular embodiment of a graphical user interface ("GUI") 200, which operates as a geospatial browser 130a for mapping module 130. The GUI includes a display window 220 for displaying 3D imagery, such as a portion of a virtual globe or other spheroid, and a text input field 203 for entering location information such as latitude and longitude, an address and/or zip code, or the name of a well-known site (e.g., "Lincoln Memorial" or "Area 51"). The GUI 200 has a number of modes in which it can operate, including Fly To mode, Local Search mode, and Directions mode, as shown by mode select buttons 201. The GUI 200 includes navigation controls 221 such as a zoom control for adjusting the viewing altitude, a tilt control for adjusting the viewing angle, a rotation control for rotating the view left and right, and a pan control for adjusting the view to areas of the 3D imagery to the left, right, top or bottom of the display window.

The GUI 200 also includes places control 205, which allows the user to organize saved data in a Places panel in a way similar to how a user would organize files and folders on a computer's hard drive. The GUI 200 also includes layer control 207, which provides a variety of data points of geographic interest (e.g., points of interest, as well as map, road, terrain, and building data) that a user can select to display over the viewing area. In the embodiment shown in FIG. 2, example commonly used layers are available on the Layers panel. The GUI 200 of this example embodiment also displays image information data 223 in the lower portion of the display window 220. Image information data 223 can include pointer/cursor coordinates (e.g. lat/lon/altitude), streaming percentage completion, and eye altitude (i.e. camera distance).

Numerous GUI configurations and underlying functionalities will be apparent in light of this disclosure, and the present disclosure is not intended to be limited to any one particular configuration. The displayed 3D imagery can be manipulated using the GUI 200. The GUI 200 can be used to reposition the current map view, for example, by clicking and dragging in the display window 220. A user may also select a geographical location by double-clicking on it within the display window 220.

Exemplary Hierarchical Spatial Partitioning Scheme

To facilitate the processing and retrieval of geospatial data in a geographic information system, such as the geographic information system 100 of FIG. 1, geospatial data, such as geographic imagery data, can be spatially partitioned into a plurality of discrete geospatial volumes with each volume corresponding to particular three dimensional coordinates and resolution. For instance, in the context of an interactive geographic information system such as a virtual globe application, the discrete geospatial volumes can represent discrete geospatial data segments for rendering a three-dimensional representation of a specific geographic locale at a given camera distance.

An exemplary hierarchical spatial partitioning scheme for spatially partitioning geospatial data for a globe or other spheroid will now be set forth. The hierarchical spatial partitioning scheme spatially partitions geospatial data corresponding to a globe or other spheroid along axes in a spherical coordinate system defined relative to the globe or spheroid.

Figure 3:
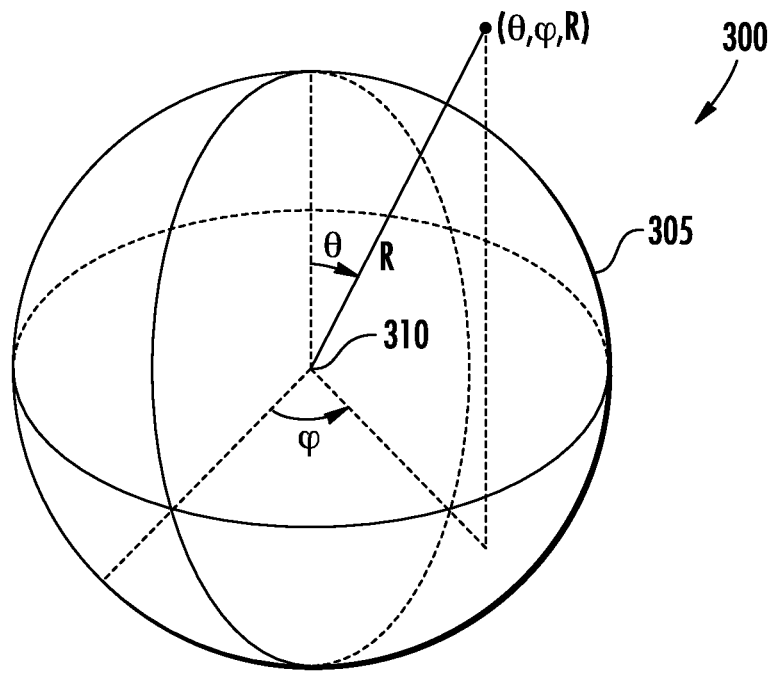
FIG. 3 depicts an exemplary spherical coordinate system defined relative to a globe.

FIG. 3 depicts a representation of an example spherical coordinate system 300 defined relative to a spheroid 305. The spherical coordinate system 300 is a coordinate system for points within the three-dimensional space associated with the spheroid 305. The position of a point is specified by a radial distance from a fixed origin (e.g. altitude), a polar angle measured from a fixed zenith direction (e.g., latitude), and an azimuth angle measured from a fixed reference direction that is orthogonal to the fixed zenith direction (e.g. longitude).

The exemplary spherical coordinate system 300 has an origin 310 at the center of the spheroid 305. The spherical coordinate system 300 includes a latitude axis θ, a longitude axis φ, and an altitude axis R. The latitude axis θ specifies an angle of rotation of a point from a first reference plane of the spheroid 305. The longitudinal axis φ specifies an angle of rotation of a point from a second reference plane orthogonal to the first reference plane of the spheroid. The altitude axis R is a radial axis that specifies the distance of a point from the origin 310 of the spheroid 305. As illustrated, the altitude axis R is always normal to the surface of the spheroid 305 in the spherical coordinate system 300.

Various modifications can be made to the spherical coordinate system depending on the specific application. In one example, in a virtual globe application associated with the Earth, the latitudinal axis can be defined in terms of degrees north from the Equator. In particular, latitude can be defined in terms of geodetic latitude (as opposed to geocentric latitude) and can be determined by the angle between the normal of an ellipsoid and the Equator. The longitudinal axis can be defined in terms of degrees east from the Prime Meridian. The altitudinal axis can be measured along the normal at the point of the Earth's surface as defined by a geoid, such as the WGS84 ellipsoid. Those of ordinary skill in the art, using the disclosures provided herein, should understand that a variety of different types of spherical coordinate systems exist for defining spherical coordinate relative to a spheroid or other body. Any spherical coordinate system can be used without deviating from the scope of the present disclosure.

Geospatial data for a globe or other spheroid can be spatially partitioned pursuant to a hierarchical spatial partitioning scheme into a plurality of discrete geospatial volumes having surfaces of constant latitude, longitude, and altitude defined along axes of a spherical coordinate system relative to the globe or other spheroid. The discrete geospatial volumes can be indexed and stored in a hierarchical tree data structure to facilitate retrieval and processing of the geospatial data. The hierarchical spatial partitioning scheme can provide for the further sub-division of each discrete geospatial volume into yet further discrete geospatial volumes as the partitioning scheme progresses through different levels in the hierarchical spatial partitioning scheme. In particular, each discrete geospatial volume can be recursively partitioned into sub-volumes along surfaces of constant latitude, longitude, and altitude. The geospatial volumes at higher levels in the hierarchical geospatial partitioning scheme can be correspond to an increased level of detail and/or resolution relative to geospatial volumes at lower levels in the hierarchical geospatial partitioning scheme.

Figure 4:
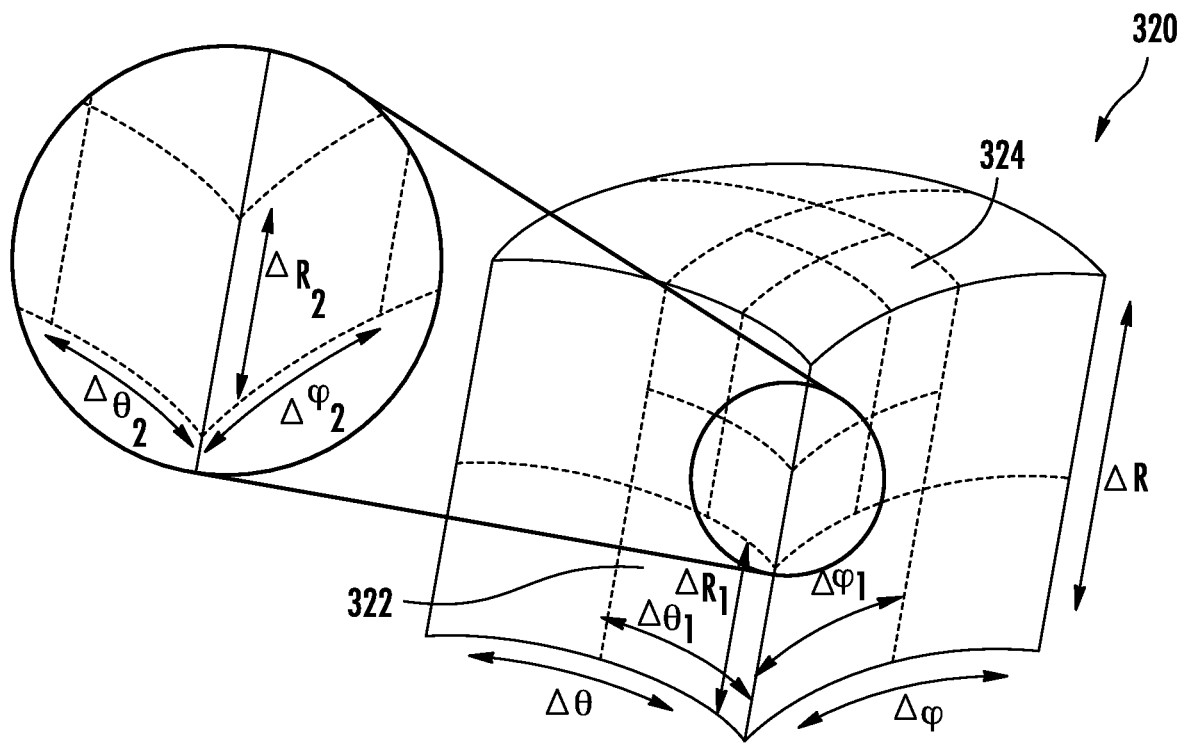
FIG. 4 depicts an exemplary geospatial volume obtained pursuant to hierarchical spatial partitioning scheme according to an exemplary embodiment of the present disclosure.

FIG. 4 depicts an exemplary discrete geospatial volume 320 having surfaces of constant latitude, longitude, and altitude defined along axes of a spherical coordinate system relative to a globe or spheroid according to an exemplary aspect of the present disclosure. The geospatial volume 320 can be one of many geospatial volumes that make up the three-dimensional space of the globe or spheroid at a particular level in the spatial partitioning hierarchy. As illustrated, the geospatial volume 320 has a latitudinal extent $\Delta\theta$, a longitudinal extent $\Delta\varphi$, and an altitudinal extent $\Delta R$. The altitudinal extent $\Delta R$ of the geospatial volume 320 is selected such that the geospatial volume 320 is approximately cubic. For instance, the altitudinal extent can be scaled by $\pi$ or approximately three (to approximate $\pi$) relative to the latitudinal extent $\Delta\theta$ such that the sides of the geospatial volume are substantially equal. As discussed in further detail below, geospatial data corresponding to the discrete geospatial volume 320, such as imagery data having geographic coordinates bound by the geospatial volume 320 and other data, can be stored as a payload of a node in a hierarchical tree data structure.

At the next level of the hierarchical spatial partitioning scheme, the geospatial volume 320 can be subdivided along surfaces of constant latitude, longitude, and altitude, into eight approximately equal sub-volumes or octants 322. Each sub-volume 322 has a latitudinal extent $\Delta\theta_1$, a longitudinal extent $\Delta\varphi_1$, and an altitudinal extent $\Delta R_1$ of exactly half of the geospatial volume 320. Geospatial data associated with the sub-volumes 322 can be stored as payloads of child nodes relative to the node corresponding to geospatial volume 320 in the hierarchical tree data structure. In some cases, geospatial data associated with sub-volumes 322 can be missing, e.g. where there is empty space. In this case, no payload information can be stored in the child node associated with the empty space.

At the next level of the hierarchical spatial partitioning scheme, each sub-volume 322 can be further spatially partitioned along surfaces of constant latitude, longitude, and altitude, into eight approximately equal sub-volumes or octants 324. Each sub-volume 324 has a latitudinal extent $\Delta\theta_2$, a longitudinal extent $\Delta\varphi_2$, and an altitudinal extent $\Delta R_2$ of exactly half of the sub-volume 322. Geospatial data associated with the sub-volumes 342 can be stored as payloads of child nodes relative to the node correspond to the sub-volume 322 in the hierarchical tree data structure. The geospatial partitioning scheme can continue in this manner for a desired number of levels in the hierarchy.

The geospatial data for each of the geospatial volumes at different hierarchical levels in the spatial partitioning scheme can have differing levels of detail and/or resolutions to facilitate level of detail management in the geographic information system. For instance, geospatial data corresponding to the sub-volumes 322 can be at a higher level of detail and/or finer resolution than geospatial data associated with the geospatial volume 320. Similarly, geospatial data correspond to the sub-volumes 324 can be at a higher level of detail and/or finer resolution than geospatial data associated with the sub-volumes 322. In this way, the size of the geospatial volumes decreases as the resolution and/or level of detail of the geospatial data corresponding to the geospatial volumes increases.

Various techniques can be used for increasing the resolution of geospatial volumes at differing levels in the spatial partitioning hierarchy. For instance, geospatial data associated with the geospatial volume 320 can include imagery having a first resolution. Geospatial data associated with the geospatial sub-volumes 322 can include imagery having a second resolution. Geospatial data associated with the geospatial sub-volumes 324 can include imagery be having a third resolution. The third resolution can be higher than the second resolution, which can be higher than the first resolution.

Alternatively, each geospatial volume 320, 322, and 324 can include imagery of the same resolution. In this embodiment, the eight sub-volumes 322 can have a combined resolution that is higher than the geospatial volume 320. The 64 sub-volumes 324 have a combined resolution that is higher than the geospatial volume 320 and the combined sub-volumes 322. While only three resolutions are identified in this example, it should be understood that any number of resolution levels may be provided.

According to a particular embodiment of the present disclosure, each geospatial volume in the spatial partitioning hierarchy can itself be maintained as a combination of eight octants. Each of the eight octants can have a volume that corresponds with a child geospatial volume relative to the geospatial volume in the hierarchical spatial partitioning hierarchy. This can provide advantages in processing data associated with each geospatial volume. For instance, imagery associated with each geospatial volume can be drawn as a selected combination of eight octants. In addition, imagery and/or other data associated with each of the eight octants can be independently blended with child geospatial volumes.

The spatial partitioning scheme according to aspect of the present disclosure can be implemented by modifying the known two-dimensional quadtree tessellation of geospatial data for a globe along the longitudinal and latitudinal axes. In particular, the existing quadtree tessellation of a globe or other spheroid can be modified to include spatial partitioning along an altitude axis into a plurality of strata such that the geospatial data is partitioned into a plurality of discrete three-dimensional volumes.

Figure 5A:
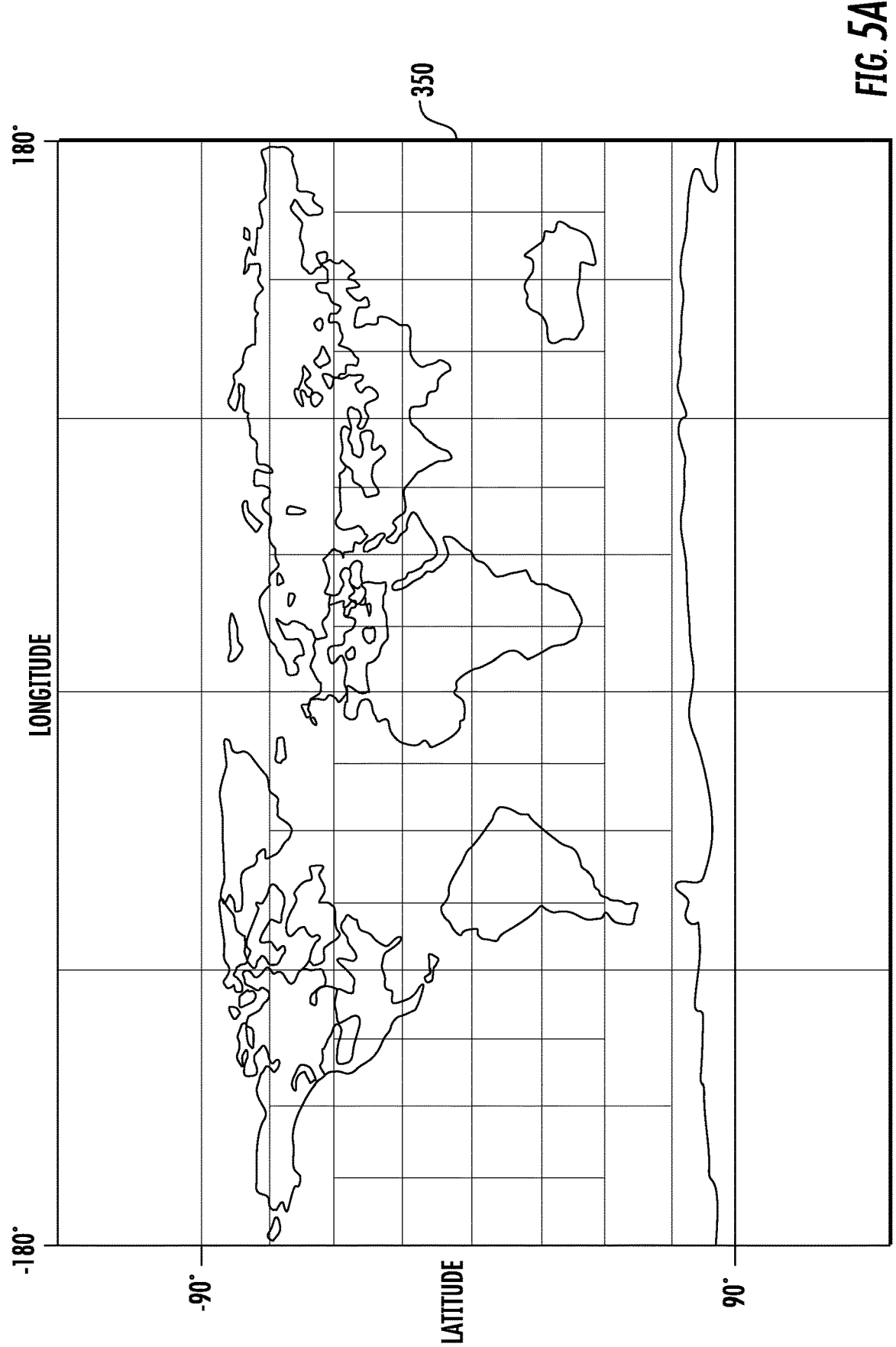
FIGS. 5A-5B depict an exemplary hierarchical spatial partitioning scheme for a virtual globe application according to an exemplary embodiment of the present disclosure.
Figure 5B:
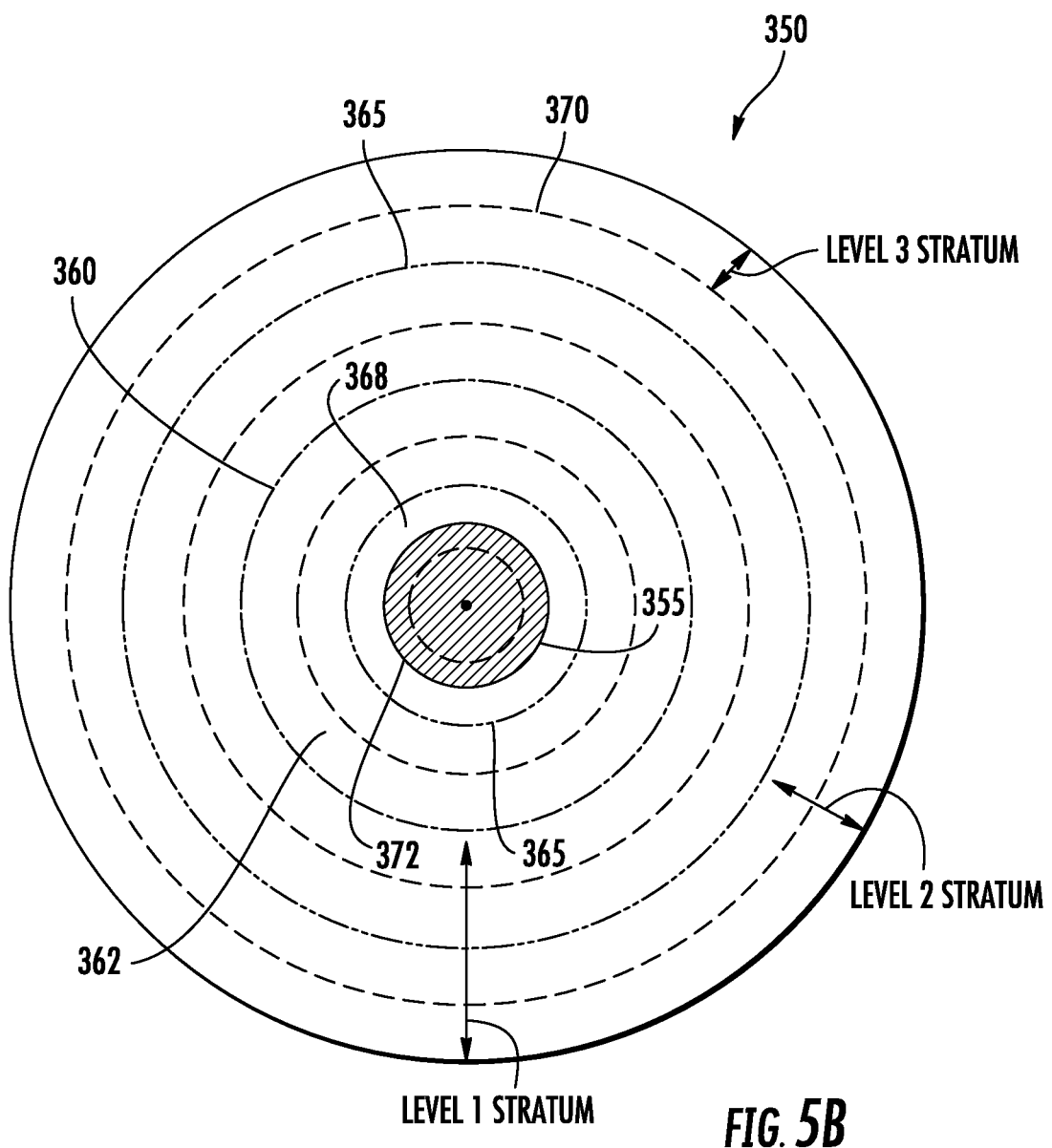

For example, FIGS. 5A and 5B illustrate an example hierarchical spatial partitioning scheme for a globe 350. FIG. 5A depicts the quadtree tessellation of the geospatial data for the virtual globe along the latitude axis and the longitude axis. FIG. 5B depicts the spatial partitioning of geospatial data for the globe into strata along the altitude axis in a spherical coordinate system defined relative to the globe.

Referring to FIG. 5A, the globe 350 is partitioned in quadtree along two-dimensions (e.g. the latitude dimension and the longitude dimension) into "tiles." A tile at each level in the hierarchy can be further subdivided into four sub-tiles, which can then be further subdivided into additional sub-tiles. As illustrated in FIG. 5A, geographic areas proximate the poles are partitioned in tritree to reduce longitudinal compression at the poles. Tritree partitioning of geospatial areas proximate the pole will be discussed in further detail below.

According to aspects of the present disclosure, geospatial data is spatially partitioned in three dimensions by additionally partitioning geospatial data along an altitude axis defined in a spherical coordinate system relative to the virtual globe. The addition of spatial partitioning along the third dimension, i.e. the altitude dimension, provides for the partitioning of geospatial data into discrete three-dimensional geospatial volumes in contrast to the two-dimensional tiles provided in a two-dimensional quadtree tessellation.

Referring to FIG. 5B, the spatial partitioning of geospatial data along the altitude axis will be discussed in detail. The altitude of a point in the geographic space 350 of the virtual globe can be defined as a floating point number describing a point's altitude relative to a normalized geoid associated with the virtual globe. For instance, in the case of a virtual globe associated with the Earth, a point's altitude can be described relative to the EGM96 geoid. The altitude coordinates are normalized by the mean radius of the geoid. In the example of the Earth, the altitude coordinates can be normalized by the mean radius of 6,371,010 meters. Other globes and spheroids would use a different normalizing value.

An altitude of 0 lies on the surface 355 of the geoid and may be considered to be sea level or equipotential surface. An altitude of −1 is not the precise center of the geoid, but is representative of an altitude of one globe radius below sea level. In the example of the Earth, an altitude of −1 is representative of an altitude of −6,371,010 meters below sea level. The normalized altitudinal extent of the geographic space 350 can extend from −1 to 5, or 5 geoid radii into space. This altitude range can be selected such that dividing by half pursuant to a hierarchical spatial partitioning scheme gives roughly cubic volumes.

More particularly, geospatial data can be partitioned along the altitude axis into a plurality of strata. Each level of the spatial partitioning hierarchy can include more strata than the previous level. The zero stratum for each level in the spatial partitioning hierarchy can be defined as the stratum that includes the altitude associated with the surface of the geoid or normalized altitude=0. The spatial partitioning of the globe or other spheroid into strata can be structured to ensure that there is not a partitioning boundary between strata located at sea level or the mean radius of the geoid.

FIG. 5B depicts the partitioning of the globe into strata across three levels of the spatial partitioning hierarchy. While three hierarchical spatial partitioning levels are illustrated in FIG. 5B for purposes of simplicity and illustration, those of ordinary skill in the art should understand that any number of spatial partitioning levels can be used in the hierarchy without deviating from the scope of the present disclosure.

At level 1 in the spatial partitioning hierarchy, geospatial data can be partitioned into a two strata. As illustrated in FIG. 5B, this is accomplished by spatially partitioning geospatial data along the surface of constant altitude 360. The surface of constant altitude 360 is associated with a normalized altitude of 2.0. The two strata provided in level 1 of the spatial partitioning hierarchy include a stratum 362 that includes the surface 355 of the geoid. The stratum 362 can be defined as the zero stratum for level 1 in the spatial partitioning hierarchy. As illustrated, the boundaries of the strata at level 1 in the hierarchy do not coincide with the surface 355 of the geoid.

At level 2 in the spatial partitioning hierarchy, each of the two strata associated with level 1 can be further partitioned along surfaces of constant altitude 365 to partition the geospatial data into four strata. The surfaces of constant altitude 365 are associated with normalized altitudes of 0.5 and 3.5 respectively. Similar to level 1, one of the stratum 368 can include geospatial data at the surface 355 of the geoid. The stratum 368 can be defined as the zero stratum for level 2 in the spatial partitioning hierarchy. As illustrated, the boundaries of the strata at level 2 in the hierarchy do not coincide with the surface 355 of the geoid.

At level 3 in the spatial partitioning scheme, each of the four strata associated with level 2 can be further partitioned along surfaces of constant altitude into eight strata. In particular, each strata associated with level 2 can be partitioned along a surface of constant altitude 370 (only one boundary designated with 370 for simplicity of illustration). Similar to levels 1 and 2 in the spatial partitioning scheme, one of the stratum 372 can include geospatial data at the surface 355 of the geoid. The stratum 372 can be defined as the zero stratum for level 3 in the spatial partitioning hierarchy. As illustrated, the boundaries of the strata at level 3 in the hierarchy do not coincide with the surface 355 of the geoid.

Partitioning geospatial data along an altitude axis defined by a spherical coordinate system associated with the globe or spheroid into strata as described above can provide numerous advantages. For instance, because the altitude axis is always normal to the surface of the globe or spheriod, chopping geospatial data into strata along the altitudinal axis can provide more efficient rendering for tall three-dimensional objects, such as tall buildings and other objects. In particular, tall buildings can be partitioned vertically in contrast to random partitioning of three dimensional buildings provided by spatial partitioning schemes rooted in Cartesian coordinates. In addition, the strata boundaries can be configured such that there is no spatial partitioning at sea level for the globe or spheroid to reduce chopping of geospatial data at sea level. While chopping may occur during rendering of drawable data associated with each discrete geospatial volume, it is not required. In one aspect, skirts can be rendered between adjacent geospatial volumes, for instance, to hide cracks between adjacent geospatial volumes of differing levels of detail.

Partitioning into strata also allows for the addressing of useful ranges of altitudes near the surface of geoid in the geographic information system using a reasonable number of bits. Exemplary stratum math for converting altitude into stratum is provided below $$\text{stratum width} = \frac{6}{2^{level}}$$

$$\text{zero stratum} = \text{floor}\left(\frac{1}{\text{stratum\_width}}\right);$$

$$\text{zero stratum\_alt} = -1 + \text{stratum width} * \text{zero\_stratum};$$

-continued $$\text{stratum alt} = \text{zerostratum alt} + \text{stratum} * \text{stratum width};$$

$$\text{stratum} = \frac{(\text{alt} - \text{zero stratum alt})}{\text{Stratum width}}$$

Importantly, spatially partitioning geospatial data along an altitude axis into strata provides a representation that aligns well and is compatible with a two-dimensional quadtree tessellation. Indeed, partitioning along two of the three dimensions (e.g the latitude dimension and the longitude dimension) in the hierarchical spatial partitioning scheme can align directly with a two-dimensional quadtree tessellation of geospatial data. For example, the latitudinal extent of each geospatial volume and a quad node can be exact. As discussed in more detail below with respect to tritree partitioning, the longitudinal extent of a polar geospatial volume can be a power of 2 times that of a quad node (e.g. 2, 4, 8, 16, etc.). This can facilitate processing of different geospatial data types in a geographic information system. For instance, terrain data objects or vector data objects for the geographic information system can be organized and indexed pursuant to a two-dimensional quadtree tessellation while imagery and texture associated with the geographic information system can be organized into discrete geospatial volumes according to exemplary aspects of the present disclosure. This can be useful in applications having data that is not desired to be split up into volumes, such as vector data in a geographic information system.

Exemplary Hierarchical Node Tree Data Structure

Figure 6:
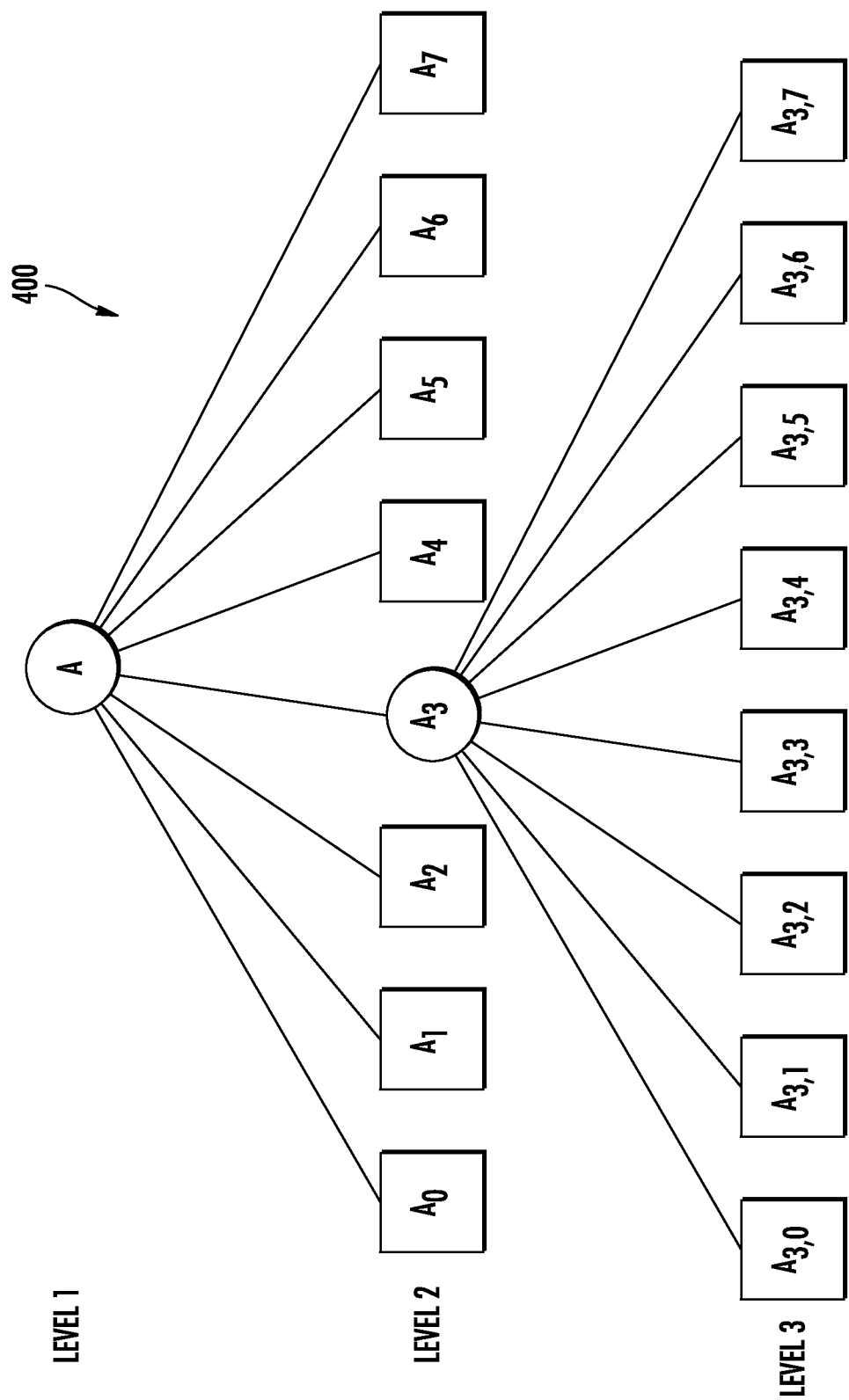
FIG. 6 depicts an exemplary hierarchical tree data structure according to an exemplary embodiment of the present disclosure.

Geospatial data and other information represented by discrete geospatial volumes obtained by spatially partitioning geospatial data along surfaces defined relative to a spherical coordinate system can be stored in a hierarchical data structure. FIG. 6 depicts an exemplary hierarchical tree data structure 400. The hierarchical tree data structure 400 can be a rooted hierarchical tree structure, such as an octree data structure. The hierarchical tree data structure 400 includes a plurality of node levels in parent-child relationship with one another.

Every node in the data structure 400 can include up to eight child or descendant nodes. In the example shown, a parent node A associated with a first node level in the data structure 400 includes references to eight child or descendant nodes $A_0$, $A_1$, $A_2$, $A_3$, $A_4$, $A_5$, $A_6$, $A_7$. The eight child or descendant nodes $A_0$, $A_1$, $A_2$, $A_3$, $A_4$, $A_5$, $A_6$, $A_7$ correspond to a second node level in the data structure 400. Following this pattern, each of the eight child or descendant nodes can include references to eight child or descendant nodes corresponding to a third node level in the data structure. As an example, node $A_3$ includes references to eight child or descendant nodes $A_{3,0}$, $A_{3,1}$, $A_{3,2}$, $A_{3,4}$, $A_{3,4}$, $A_{3,5}$, $A_{3,6}$, and $A_{3,7}$. While only three levels of the hierarchical tree data structure 400 are shown, the hierarchical tree data structure 400 can have any desired number of levels depending on the application.

The hierarchical node tree data structure 400 is particularly well suited for indexing geospatial data spatially partitioned pursuant to the exemplary hierarchical spatial partitioning schemes according to aspects of the present disclosure. In the example shown, the parent node A can have as a payload geospatial data corresponding to a first geospatial volume, such as the discrete geospatial volume 320 depicted in FIG. 4. The geospatial volume 320 can be spatially partitioned along axes defined in a spherical coordinate system to obtain eight sub-volumes 322. Each of the eight sub-volumes 322 can be mapped or associated with one of the eight child or descendant nodes $A_0$, $A_1$, $A_2$, $A_3$, $A_4$, $A_5$, $A_6$, $A_7$ in the second node level in the data structure 400 of FIG. 6. Each of the eight sub-volumes 322 can be further spatially partitioned along axes defined in a spherical coordinate system to obtain eight sub-volumes 324 as shown in FIG. 4. Each of these sub-volumes 324 can be mapped or associated with one of the eight child or descendant nodes $A_{3,0}$, $A_{3,1}$, $A_{3,2}$, $A_{3,4}$, $A_{3,4}$, $A_{3,5}$, $A_{3,6}$, and $A_{3,7}$ in the third node level in the hierarchical tree data structure of FIG. 6. In this manner, there can be a direct mapping between nodes in the hierarchical tree data structure 400 and geospatial volumes obtained pursuant to exemplary embodiments of the present disclosure.

The location and/or addresses of files having geospatial data corresponding to nodes in a hierarchical node data structure can be provided in any suitable format. Addressing schemes can include:

quadtreepath+stratum: (e.g. 123123123s1)
level/row/column/stratum: (e.g. 112_r123456_c7893_s10)
octreepath: (e.g. 1234567)

Quadtree path+stratum takes advantage of the addressing of quad nodes in quadtree tessellation of geospatial data in two dimensions about a latitude axis and longitude axis. The addition of the stratum to the quadtree address provides a unit of distance in the altitude direction to identify the altitudinal location of the discrete geospatial volume in the spherical space associated with the virtual globe or spheroid. Quadtreepath+stratum has the benefit of degrading nicely to a quadtree path used in certain data processing. In a particular implementation, quadtree path+stratum can be used where the zero stratum is defined as the stratum which contains sea level or the mean surface of the globe. This allows the representation of a sensible range of altitude close to sea level using a reduced number of bits.

Going between parent and child in stratum can be provided by:

```
Int StratumTools:: ParentStratumForStratum (int stratum, int level) {
    Return ((stratum +ZeroStratumForLevel(level)) >>1) –
        ZeroStratumForLevel(level– 1);
}
Pair<int, int> StratumTools::ChildStrataForStratum (int stratum, int level)
{
    Int64 child_stratum = (statum + ZeroStratumFor Level(level)) * 2 –
        ZeroStratumForLevel(level +1);
    Return pair <int, int> (child_stratum, Child_stratum +1);
}
```

Figure 7:
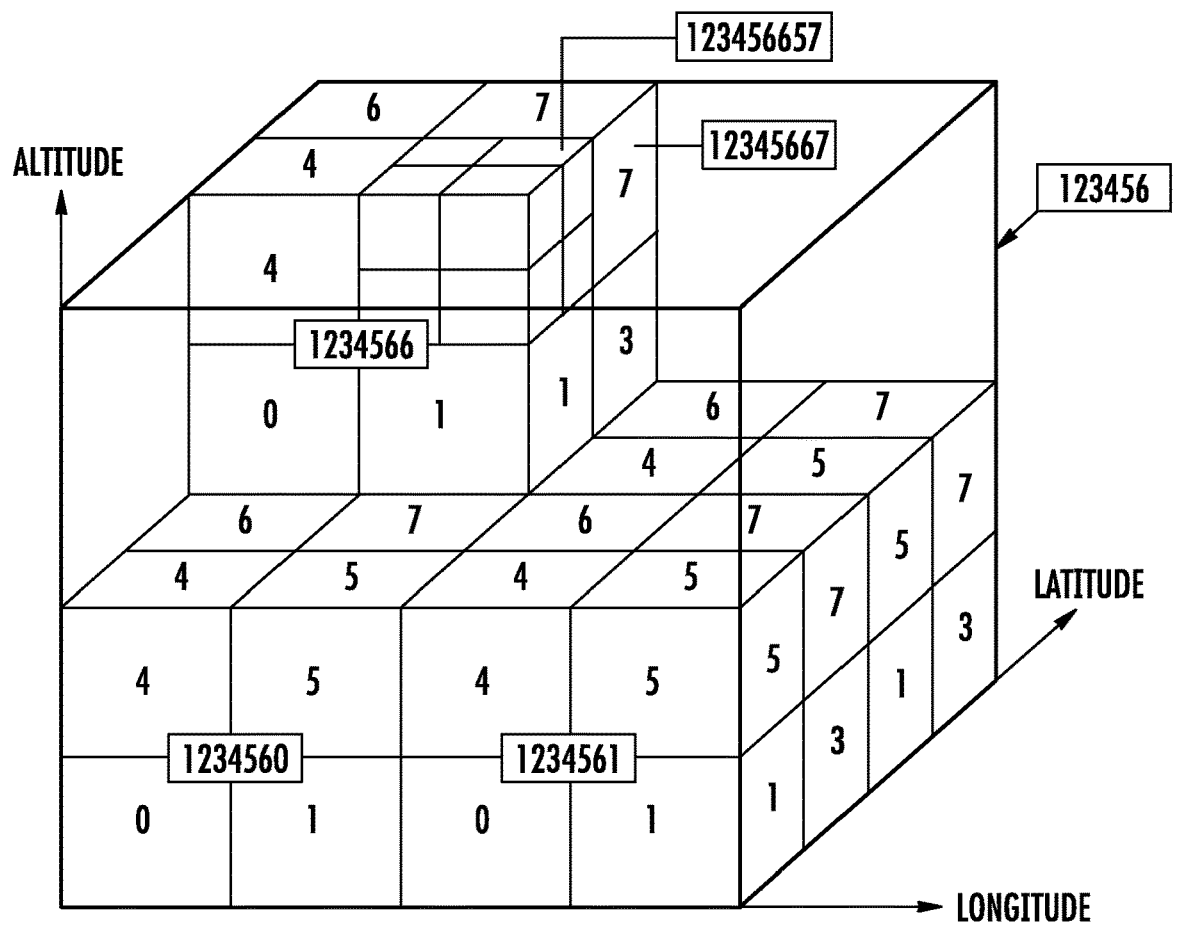
FIG. 7 depicts an exemplary octree naming scheme that can be used in accordance with an exemplary embodiment of the present disclosure.

Octreepath provides for the addressing of nodes based on the octree structure of the hierarchal tree data structure. A typical octree naming scheme is provided in FIG. 7. As shown, each discrete geospatial volume can be spatially partitioned into eight octants along surfaces of constant latitude, longitude, and altitude. The naming convention for each octant is set forth in the following table:

| Octant | Location |
| --- | --- |
| 0 | Lower Southwest |
| 1 | Lower Southeast |
| 2 | Lower Northwest |
| 3 | Lower Northeast |
| 4 | Upper Southwest |
| 5 | Upper Southeast |
| 6 | Upper Northeast |
| 7 | Upper Northwest |

The naming convention in octree can also trivially indicate parent/child relationships. For instance, nodes 1234560, 1234561, and 1234566 are child nodes of node 123456. Nodes 12345666 and nodes 12345667 are child nodes of 1234566. Node 123456657 is a child node of node 12345665.

Nodes in the hierarchical tree data structure can store or refer to geospatial data in any suitable file format. For instance, while nodes correspond to discrete geospatial volumes obtained by partitioning space into spherical coordinates, geospatial data associated with a node can be expressed in Cartesian coordinates. This can avoid expensive translation from latitude, longitude, and altitude to x, y, and z by clients in the geographic information system. Additional information can also be stored in node files, including data indicative of longitudinal span (useful for tritree partitioning) and data associated with a Certesian bounding sphere or bounding box.

Exemplary Client Side Processing, Culling, and Level of Detail Management

Referring back to FIG. 1, exemplary client side processing of a hierarchical tree data structure to render a three dimensional representation of a geographic area according to an exemplary embodiment of the present disclosure will now be discussed. In particular, the mapping module 130 associated with the client device can include software that operates (in conjunction with server-side software) to provide geographic/geospatial images to a user's computer (or generally, client device) so they can be seen by the user or otherwise processed. In accordance with one particular embodiment, the mapping module 130 includes a user interface module, in which a motion model in the user's client is used to adjust the client's virtual viewing position and orientation relative to the visual environment of the system. The motion model also determines a view specification which defines the client's viewable volume within a three-dimensional space (this viewable volume is known as a frustum and herein referred to as the user's visual environment), and the position and orientation of the frustum, herein referred to as the virtual camera viewpoint, with respect to a three-dimensional map. The camera distance refers to the distance between the virtual camera viewpoint and the representation of the geographic area. Once a visual specification is determined, it is placed in the memory.

The view specification can be read from the memory by a renderer, which is a software tool that draws or "renders" drawable data. The renderer can be configured to repeat a processing cycle, which includes: (1) reading the view specification in memory, (2) traversing a hierarchical data structure in memory, (e.g in which each node of the hierarchical tree data structure contains or refers to drawable data), and (3) drawing the drawable data contained in the data structure. During the processing cycle, cull and level of detail calculations can be performed and any needed non-resident data can be fetched from a remote server.

For example, the hierarchical tree data structure can include a data structure with each node having a payload associated with a discrete geospatial volume defined by axes in a spherical coordinate system and references to up to eight child nodes. When the renderer traverses the node tree, it first reads the payload of data in a parent node. If the payload is drawable data, the renderer will compare a bounding volume (a volume that contains the data) of the payload associated with the node, if present, to the view specification. If the bounding volume is completely disjoint from the view specification or the calculated level of detail is too fine or too coarse, the data will not be drawn, despite the fact that the node has already been downloaded from a remote server. More particularly, the renderer can start at the root of the rocktree and traverse downwards to finer levels in the hierarchical tree data structure skipping nodes that are considered too coarse to draw. The renderer can stop traversing the data structure at nodes that are too fine and draw the drawable data associated with nodes at the appropriate level of detail.

If the payload is considered appropriate to draw, the renderer will attempt to access each of the references of the node. If the reference contains an address to a file in local memory, the renderer will go to that child node and read the payload, repeating the process for each subsequent child node until it encounters a node with a payload that has a bounding volume completely disjoint from the view specification or the calculated level of detail is too fine or too coarse. If the reference does not contain an address in the local memory (i.e., the referenced file does not exist in the local memory), the renderer cannot access the file, and will continue to move down the node tree (to the extent the child nodes are available in the node tree) without trying to obtain the file.

The node itself can have a built-in accessor function. When the renderer attempts to access a reference that has a filename, but no corresponding local address, this triggers the accessor function of the node to identify any missing nodes or needed data related to the nodes onto a cache node retrieval list, which comprises a list of information identifying files to be downloaded from remote servers. A network loader in an independent network loader thread reviews the cache node retrieval list and requests the files referenced on the list from remote servers via a network interface.

A cache node manager in an independent cache node manager thread allocates space in local memory (e.g. local RAM and disk (if available)) and organizes files retrieved by the network loader into new nodes. The cache node manager also updates the parent nodes with the local memory address of these new child nodes. Therefore, on subsequent cycles of the renderer module, there will be additional nodes in local memory for the renderer to access. As in previous cycles, the renderer will look at the payload and draw all drawable data that does not fall completely outside the view specification. The renderer thread will continue this cycle until it reaches a node with a payload that has a bounding volume completely disjoint from the view specification, the level of detail is too fine or too coarse, or is otherwise inappropriate to draw. Thus, the renderer only draws what is already downloaded, and it only stops drawing when it encounters already downloaded data that has a bounding volume completely disjoint or level of detail too fine or too coarse relative to the view specification.

According to one exemplary aspect of the present disclosure, the bounding volume of a payload of a node is a bounding sphere that substantially conforms to the discrete geospatial volume associated with the node as well the volumes of all its descendants. This can allow any curvature issues at courser levels and at the poles to be ignored. In addition, sphere computation is simple and can be done offline. Cull test and projection of spheres for level of detail calculations are trivial and relatively fast.

Figure 8:
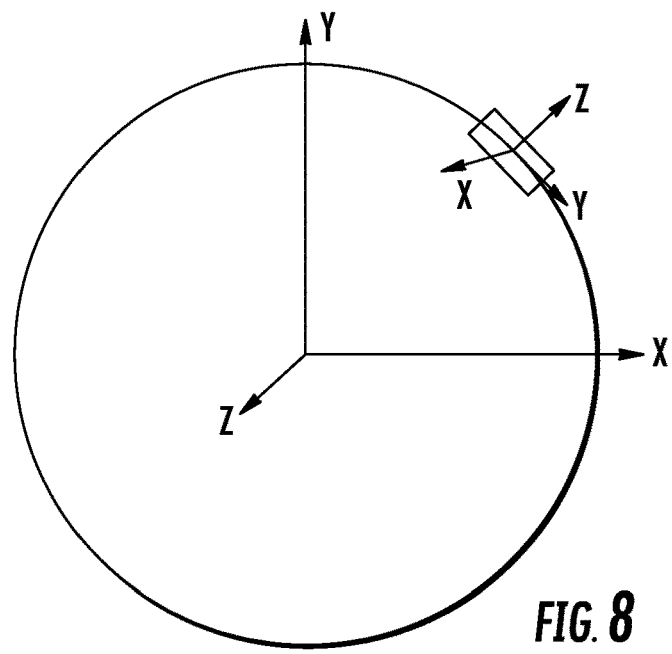
FIG. 8 depicts an exemplary bounding box defining a local Cartesian coordinate system according to an exemplary embodiment of the present disclosure.

If bounding boxes are needed instead of spheres (e.g. for tighter culling), nodes associated with higher levels in the spatial partitioning hierarchy can define an axis-aligned bounding box in its own local Cartesian coordinate system where the z-axis is normal to the surface of the globe and x-axis is the line of constant latitude. An exemplary axis-aligned bounding box defined in its own local Cartesian coordinate system is depicted in FIG. 8. As shown, the axis-aligned bounding box has a z-axis normal to the globe. This can require transforming the viewing frustrum into the node's local coordinate space. However, this does not need to be accomplished per node but whenever the error tolerance between coordinate system is exceeded. An added benefit of axis-aligned bounding boxes is that they can be nearly perfectly aligned with terrain and buildings and do not suffer bloat factor that can occur for certain geometry located at 45 degree angles (in latitude) in a virtual globe.

Special Tritree Partitioning at the Poles

As mentioned above, aspects of the present disclosure provide for tritree partitioning at the poles of a spheroid to reduce longitudinal compression of geospatial objects, such as two-dimensional tiles or three-dimensional discrete geospatial volumes, in a geographic information system. A geospatial object refers to any discrete geospatial space or data associated with a discrete geospatial space, such as a two-dimensional tile or three-dimensional discrete geospatial volume. Tritree partitioning can be a modified quadtree tessellation which tries to keep the aspect ratio of geospatial areas located adjacent to the poles as close as possible to one (e.g. the aspect ratio of Cartesian or real world distances are roughly equal). In this manner, tritree partitioning at the poles can provide for the improved display of imagery at the poles in an interactive geographic information system associated with a virtual globe or other spheroid. Tritree partitioning can start happening at any level of the spatial partitioning hierarchy, such as at any level greater than level 1 in the hierarchical spatial partitioning scheme.

Figure 9A:
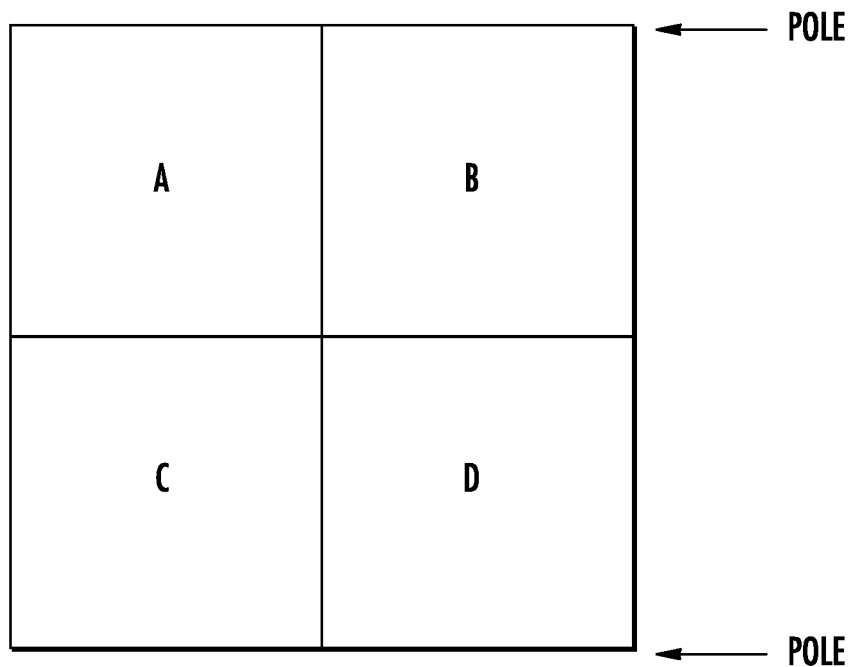
FIGS. 9A-9C depicts the exemplary tritree partitioning of geospatial objects located adjacent to a pole of a globe or other spheroid according to an exemplary embodiment of the present disclosure.
Figure 9B:
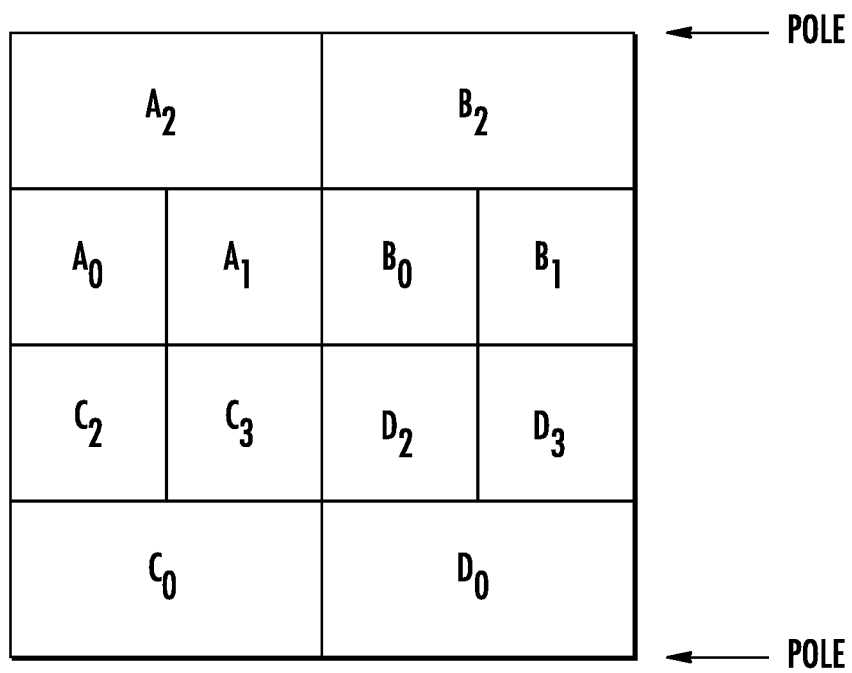
Figures 9C, 12:
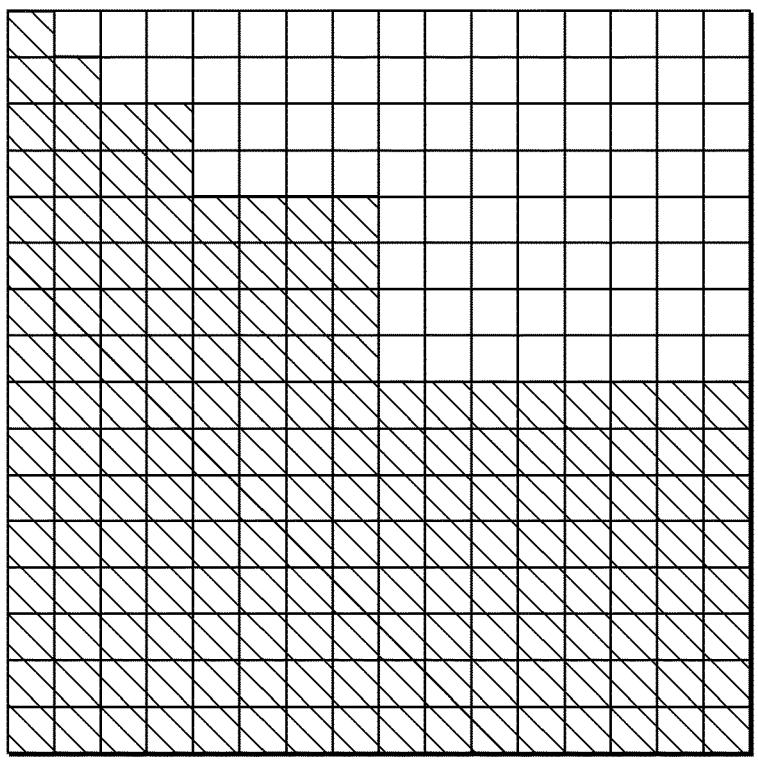
FIG. 12 depicts a graphical representation of the selection of quad node locations for polar geospatial objects in a hierarchical tree data structure according to an exemplary embodiment of the present disclosure.

In tritree spatial partitioning, at levels greater than the start level for tritree spatial partitioning, each geospatial object that is located adjacent a pole of a virtual globe or spheroid is subdivided into three child geospatial objects— the usual two child geospatial objects located away from the pole, but only one child geospatial object located adjacent the pole. The child geospatial object located adjacent the pole has the same longitudinal extent of its parent and spans the combined longitudinal extent of the child geospatial objects located away from the pole. This can reduce longitudinal compression and improve the aspect ratio of geospatial objects located adjacent to the poles, An exemplary tritree spatial partitioning of geospatial objects is illustrated in FIGS. 9A-9C. FIG. 9A depicts the latitudinal and longitudinal tessellation of a flat projection of a spheriod at level 2 in a spatial partitioning hierarchy. As shown, the spheroid has been tessellated in quadtree into four geospatial objects or "tiles" A, B, C, and D. Each of the four tiles A, B, C, and D is associated with a geospatial location adjacent to a pole of the spheroid. A tile that is located adjacent the pole is a polar geospatial object and can be referred to as a polar tile.

Figure 11A:
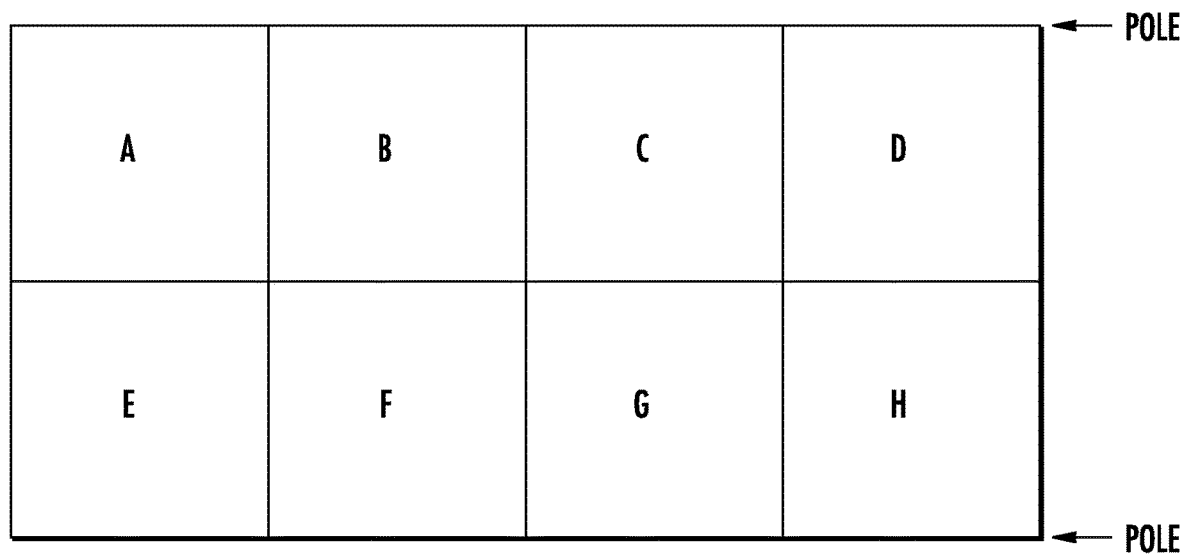
FIGS. 11A-11C depicts the exemplary tritree partitioning of geospatial objects located adjacent to a pole of a globe or other spheroid according to another exemplary embodiment of the present disclosure.
Figure 11B:
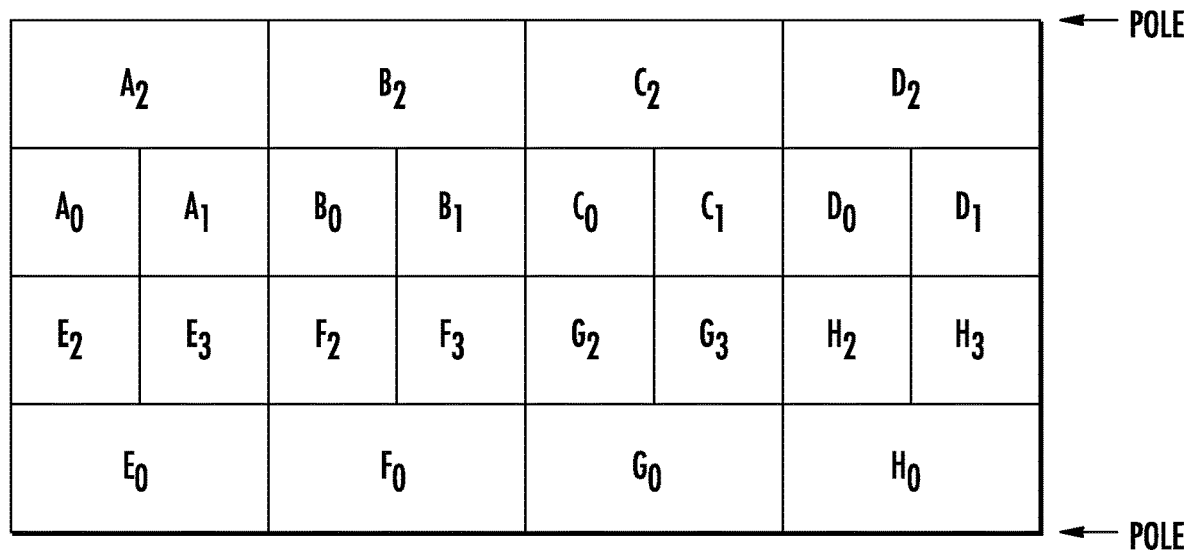
Figures 11C, 13:
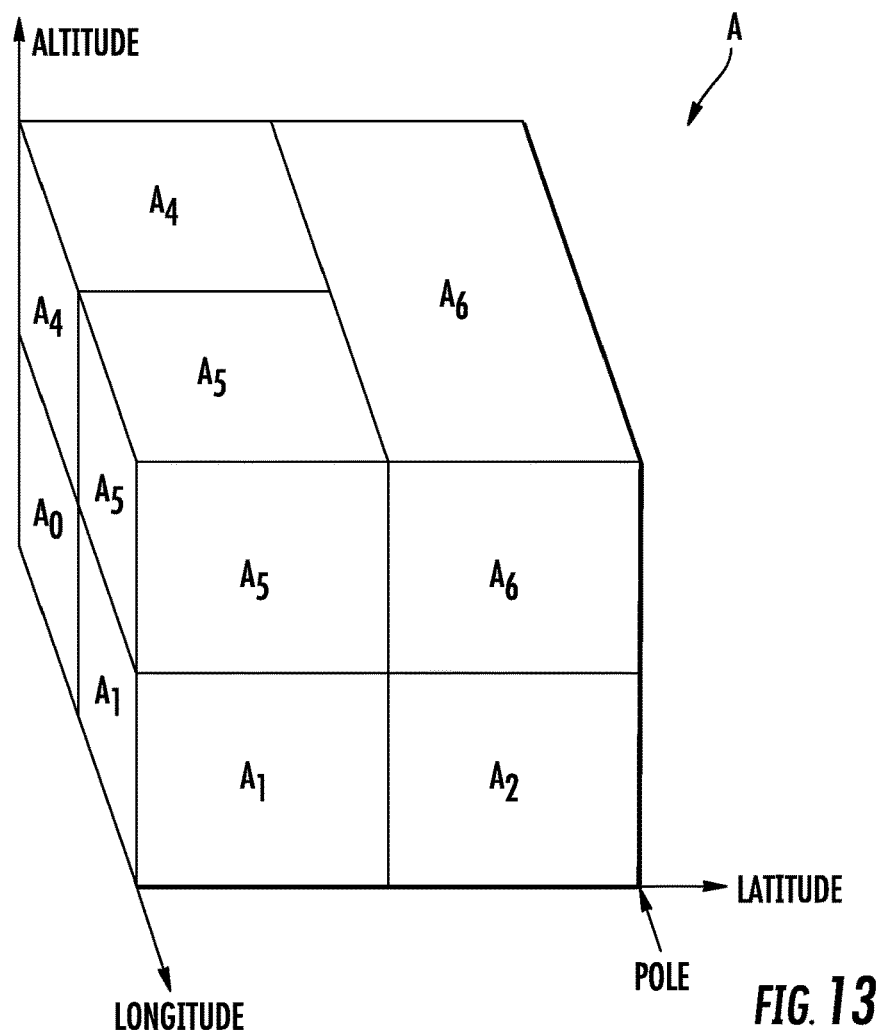
FIG. 13 depicts the exemplary tritree partitioning of a discrete three-dimensional volume located adjacent a pole of a globe or other spheroid according to an exemplary embodiment of the present disclosure.

The example shown FIGS. 9A-9C is discussed with reference to tritree partitioning of four polar tiles A, B, C, and D beginning after level 2 (i.e. levels 3 and higher in a spatial partitioning hierarchy) for purposes of simplicity and illustration. Those of ordinary skill in the art, using the disclosures provided herein, should understand that tritree partitioning can begin at any level in the spatial partitioning hierarchy with any suitable number of polar tiles. In a virtual globe application, tritree partitioning preferably begins after level three in the hierarchy with eight polar tiles arranged in a 4×2 grid as depicted in FIGS. 11A-11C.

Figure 10:
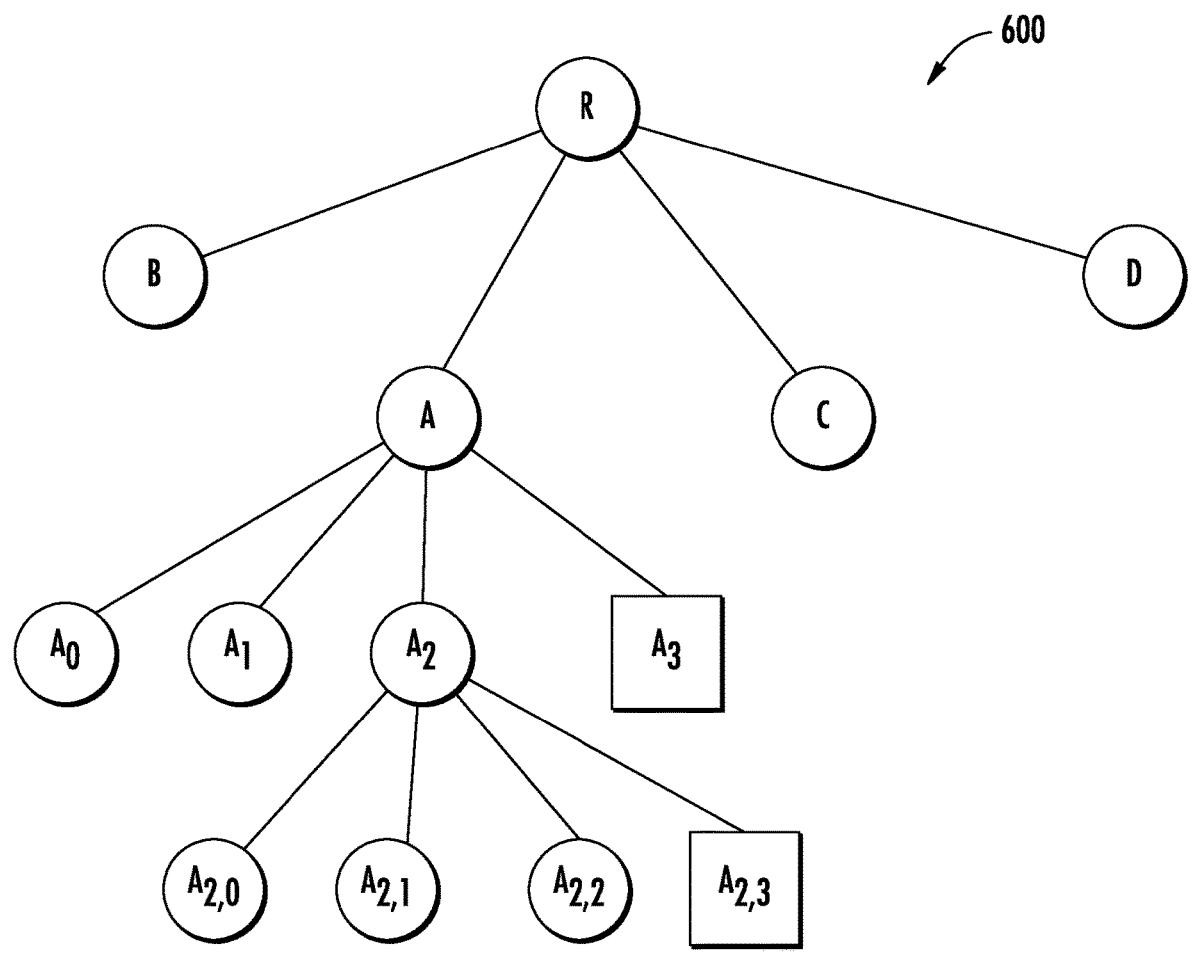
FIG. 10 depicts a portion of the exemplary hierarchical tree data structure corresponding to the geospatial objects of FIGS. 9A-9C.

Referring to FIG. 9B, each of the polar tiles A, B, C, and D is spatially partitioned in tritree into three sub-tiles. One sub-tile is located adjacent the pole while the other two sub-tiles are located away from the pole. This results in four tiles adjacent the pole, namely polar tiles $A_2$, $B_2$, $C_0$, and $D_0$. As one example, tile A is partitioned into sub-tiles $A_2$, $A_0$ and $A_1$. The sub-tile $A_2$ is located adjacent the pole and constitutes a polar tile. Sub-tiles $A_0$ and $A_1$ are located away from the pole. The polar tile $A_2$ can be considered to have merged with or absorbed its neighboring tile to the east (e.g. tile $A_3$) and has the same longitudinal extent as its parent tile A. The polar tile $A_2$ also spans the combined longitudinal extent of the sub-tiles $A_0$ and $A_1$. As illustrated in FIG. 10, each of the tiles $A_2$, $A_0$, and $A_1$ are stored in child nodes relative to the parent node associated with tile A in a hierarchical tree data structure 600.

Referring to FIG. 9C, each of the polar tiles $A_2$, $B_z$, $C_0$, and $D_0$ located adjacent to the pole are further partitioned in tritree into three sub-tiles. The remaining tiles are partitioned into four sub-tiles according to a typical quadtree tessellation. This results in four polar tiles being located adjacent to the poles, namely tiles $A_{2,2}$, $B_{2,2}$, $C_{0,0}$, and $D_{0,0}$. As one example, tile $A_2$ is partitioned into sub-tiles $A_{2,2}$ $A_{2,0}$ and $A_{2,1}$. The sub-tile $A_{2,2}$ is located adjacent the pole and is a polar sub-tile. The sub-tiles $A_{2,0}$ and $A_{2,1}$ are located away from the poles. The sub-tile $A_{2,2}$ can be considered to have merged with or absorbed its neighboring tile to the east (e.g. tile $A_{2,3}$) and has the same longitudinal extent as its parent tile $A_2$. The sub-tile $A_{2,2}$ also spans the combined longitudinal extent of the geospatial objects $A_{2,0}$ and $A_{2,1}$. Each of the sub-tiles $A_{2,2}$, $A_{2,0}$, and $A_{2,1}$ are stored in child nodes relative to the tile $A_2$.

FIG. 10 depicts a portion of the hierarchical tree data structure 600 associated with the geospatial objects depicted in FIGS. 9A-9C. The hierarchical tree data structure 600 illustrates the parent-child hierarchy among tiles subject to tritree partitioning. In particular, tiles are associated with child nodes in the hierarchical tree data structure 600 selected to preserve parent-child hierarchy among polar geospatial objects across three or more node levels in the data structure 600.

For example, each sub-tile of a polar tile is associated with a child node of the node corresponding to its parent polar tile. For instance, as illustrated in FIG. 10, the tiles $A_2$, $A_0$ and $A_1$ are all stored as child nodes relative to the node associated with polar tile A. The polar tile $A_2$ can be stored in the "northwestern" most child node (i.e. the child node typically associated with the northwestern quad node in a normal quadtree tessellation) associated with the polar tile A. Child node $A_3$ is not associated with any geospatial object as the tile $A_3$ can be considered to be merged with or absorbed by tile $A_2$. The tiles $A_0$ and $A_1$ are also associated with child nodes relative to the node associated with polar tile A.

Moving to the next node level in the hierarchical tree data structure, the sub-tiles $A_{2,2}$, $A_{2,0}$, and $A_{2,1}$ are stored as child nodes relative to the tile $A_2$ in the hierarchical tree data structure 600. The polar tile $A_{2,2}$ can be stored in the "northwestern" most child node associated with the polar tile $A_2$. Child node $A_{2,3}$ is not associated with any geospatial object as the tile $A_{2,3}$ can be considered to have merged with or have been absorbed by tile $A_{2,2}$. The tiles $A_{2,0}$ and $A_{2,1}$ can also be associated with child nodes relative to the polar tile $A_2$.

In a conventional quadtree indexing scheme, the tile $A_{2,1}$ would typically be associated with a node in the hierarchical tree data structure corresponding to a southeastern quadrant in a quadtree partitioning scheme. However, pursuant to an indexing scheme according to aspects of the present disclosure, the tile $A_{2,1}$ is stored as a sub-tile of tile $A_2$ to preserve parent-child hierarchy among three or more node levels in the hierarchical tree data structure. The result of indexing in this manner is a dense subtree descending from each of the polar geospatial objects associated with the level where tritree partitioning is initiated. In the example of FIGS. 9A-9C, there would be four dense subtrees descending from nodes associated with each of the polar geospatial objects A, B, C, and D.

FIGS. 11A-11C depict exemplary tritree partitioning for a globe being initiated at a higher level in the spatial partitioning hierarchy where there are eight polar tiles A, B, C, D, E, F, G, and H. In particular, FIG. 11A depicts the latitudinal and longitudinal tessellation of an equirectangular projection of a virtual globe at level 3 in a spatial partitioning hierarchy. As shown, the virtual globe has been tessellated in quadtree into eight geospatial objects or "tiles" A, B, C, D, E, F, G, and H Each of the eight tiles A, B, C, D, E, F, G, and H is associated with a geospatial location adjacent to a pole of the virtual globe.

As shown in FIG. 11B, tritree partitioning begins after level 3 (i.e. level 4 and higher) in the spatial partitioning hierarchy. Each of the polar tiles A, B, C, D, E, F, G, and H is spatially partitioned in a tritree into three sub-tiles. One sub-tile is located adjacent the pole while the other two sub-tiles are located away from the pole. This results in eight tiles adjacent the pole, namely polar tiles $A_2$, $B_2$, $C_2$, $D_2$, $E_0$, $F_0$, $G_0$, and $H_0$. As one example, tile A is partitioned into sub-tiles $A_2$, $A_0$ and $A_1$. The sub-tile $A_2$ is located adjacent the pole and constitutes a polar tile. Sub-tiles $A_0$ and $A_1$ are located away from the pole. The polar tile $A_2$ can be considered to have merged with or absorbed its neighboring tile to the east (e.g. tile $A_3$) and has the same longitudinal extent as its parent tile A. The polar tile $A_2$ also spans the combined longitudinal extent of the sub-tiles $A_0$ and $A_1$.

Referring to FIG. 11C, each of the polar tiles $A_2$, $B_2$, $C_2$, $D_2$, $E_0$, $F_0$, $G_0$, and $H_0$ located adjacent to the pole are further partitioned in tritree into three sub-tiles. This results in eight polar tiles being located adjacent the poles, namely $A_{2,2}$, $B_{2,2}$, $C_{2,2}$, $D_{2,2}$, $E_{0,0}$, $F_{0,0}$, $G_{0,0}$, and $H_{0,0}$. The remaining tiles are partitioned into four sub-tiles according to a typical quadtree tessellation. As one example, tile $A_2$ is partitioned into sub-tiles $A_{2,2}$ $A_{2,0}$ and $A_{2,1}$. The sub-tile $A_{2,2}$ is located adjacent the pole and is a polar sub-tile. The sub-tiles $A_{2,0}$ and $A_{2,1}$ are located away from the poles. The sub-tile $A_{2,2}$ can be considered to have merged with or absorbed its neighboring tile to the east (e.g. tile $A_{2,3}$) and has the same longitudinal extent as its parent tile $A_2$. The sub-tile $A_{2,2}$ also spans the combined longitudinal extent of the geospatial objects $A_{2,0}$ and $A_{2,1}$. Each of the sub-tiles $A_{2,2}$, $A_{2,0}$, and $A_{2,1}$ are stored in child nodes relative to the tile $A_2$.

Similar to the example discussed above with respect to FIGS. 9A-9C, tiles are associated with child nodes in a hierarchical tree data structure selected to preserve parent-child hierarchy among polar geospatial objects across three or more node levels in the data structure. This results in a dense subtree descending from each of the nodes associated with the tiles A, B, C, D, E, F, G, and H. This is graphically represented in FIG. 12, which depicts an exemplary polar tile at a zoom level where tritree partitioning is initiated, such as an exemplary polar tile A. Each cell in the grid represents a quadtree node four levels lower in the tree. The shaded regions indicate the quadtree locations where tiles are stored.

While tritree partitioning is discussed above with reference to two-dimensional spatial partitioning of geospatial objects such as tiles, tritree partitioning is equally applicable in a three-dimensional spatial partitioning of geospatial data, such as spherical hierarchical spatial partitioning scheme according to exemplary aspects of the present disclosure. FIG. 13 depicts the tritree partitioning of an exemplary discrete geospatial volume A according to an exemplary embodiment of the present disclosure. The geospatial volume A can be located proximate a pole of a virtual globe or other spheroid.

As shown, the geospatial volume is partitioned in tritree into two sub-volumes $A_2$ and $A_6$ located proximate the pole and four sub-volumes $A_0$, $A_1$, $A_4$ and $A_5$ located away from the pole. The sub-volumes $A_2$ and $A_6$ each have a longitudinal extent equal to the parent geospatial volume A and equal to the combined longitudinal extent of the four sub-volumes $A_0$, $A_1$, $A_4$ and $A_5$. The sub-volumes $A_2$ and $A_6$ can be referred to as polar geospatial volumes. The polar geospatial volumes $A_2$ and $A_6$ can be further partitioned in tritree as the hierarchical spatial partitioning scheme progresses through additional hierarchical levels.

The three dimensional tritree partitioning scheme can be implemented by first performing tritree partitioning of the geospatial data in two-dimensions along the longitudinal and latitudinal axes. The geospatial data is then spatially partitioned in the third dimension by additionally partitioning geospatial data along an altitude axis defined in a spherical coordinate system relative to a globe or spheroid. In this manner, discrete geospatial volumes located adjacent to the poles can be partitioned in tritree to reduce longitudinal compression at the poles.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of storing geospatial data in a geographic information system associated with a spheroid, comprising:
spatially partitioning geospatial data into a plurality of discrete geospatial volumes along surfaces of constant altitude defined in a spherical coordinate system relative to the spheroid pursuant to a hierarchical spatial partitioning scheme, wherein a first geospatial volume is located adjacent a pole of the spheroid, a second geospatial volume being obtained by spatially partitioning the first geospatial volume along surfaces of constant latitude, longitude, and altitude in the spherical coordinate system in a tritree to obtain six sub-volumes, two of the six sub-volumes being located adjacent to the pole of the spheroid and four of the six sub-volumes located away from the pole of the spheroid, each of the two sub-volumes located adjacent the pole of the spheroid having a longitudinal span that is equal to a longitudinal span of the first geospatial volume;
storing geospatial data associated with each of the plurality of discrete geospatial volumes in a memory as a node of a plurality of nodes in a hierarchical tree data structure, wherein each of the plurality of nodes comprises a respective payload of the geospatial data and at least one reference to an address of a file having geospatial data in the memory;
receiving a map information request from a client device; and
traversing the hierarchical tree data structure and drawing, by a renderer, each node that has a respective payload that is determined to be drawable according to the map information request, wherein the renderer determines a node to be drawable based on a comparison of a bounding box of the respective payload of the node to a view specification defining a viewable volume of the client device, wherein a node with a respective payload that is too coarse to draw is skipped by the renderer from being drawn, and wherein traversal of the hierarchical tree data structure stops when a node with a respective payload that is too fine to draw is encountered.

2. The computer-implemented method of claim 1, wherein the plurality of discrete geospatial volumes comprises the first geospatial volume having boundaries defined at least in part by surfaces of constant altitude in the spherical coordinate system, the geospatial data associated with the first geospatial volume being stored in the memory as a first node in the hierarchical tree data structure.

3. The computer-implemented method of claim 2, wherein the plurality of discrete geospatial volumes comprises the second geospatial volume, the second geospatial volume being a sub-volume of the first geospatial volume obtained by spatially partitioning the first geospatial volume along surfaces of constant altitude in the spherical coordinate system, the geospatial data associated with the second geospatial volume being stored in the memory as a child node relative to the first node in the hierarchical tree data structure.

4. The computer-implemented method of claim 3, wherein the second geospatial volume is obtained by spatially partitioning the first geospatial data volume along surfaces of constant latitude, longitude, and altitude in the spherical coordinate system into eight sub-volumes having substantially equal volume.

5. The computer-implemented method of claim 4, wherein an altitude span for each sub-volume is selected such that each of the eight sub-volumes is approximately cubic.

6. The computer-implemented method of claim 1, wherein an altitude span of each discrete geospatial volume is approximately three times a latitudinal span of each discrete geospatial volume.

7. The computer-implemented method of claim 1, wherein the method comprises storing geospatial data associated with each of the six sub-volumes in the memory as at least a part of a payload of one of a plurality of second nodes in the hierarchical tree data structure, each of the plurality of second nodes being a child node of the first node in the hierarchical tree data structure.

8. A non-transitory computer-readable medium encoded with a hierarchical tree data structure for geospatial data in a geographic information system associated with a virtual globe, the hierarchical tree data structure having a plurality of nodes, the plurality of nodes comprising:
a parent node associated with a geospatial volume defined in spherical coordinates associated with the virtual globe;
a plurality of first descendant nodes, each of the first descendant nodes being a child node relative to the parent node in the hierarchical tree data structure and being associated with one of a plurality of first geospatial sub-volumes, the plurality of first geospatial sub-volumes obtained by spatially partitioning the geospatial volume along a surface of constant altitude defined in a spherical coordinate system into a plurality of strata pursuant to a hierarchical spatial partitioning scheme, wherein a first geospatial sub-volume is located adjacent a pole of the virtual globe, a second geospatial sub-volume being obtained by spatially partitioning the first geospatial sub-volume along surfaces of constant latitude, longitude, and altitude in the spherical coordinate system in a tritree to obtain six sub-volumes, two of the six sub-volumes being located adjacent to the pole and four of the six sub-volumes located away from the pole, each of the two sub-volumes located adjacent the pole having a longitudinal span that is equal to a longitudinal span of the first geospatial sub-volume, wherein the geospatial data associated with each of the plurality of first geospatial sub-volumes is stored in a memory as a node of the first plurality of descendant nodes in the hierarchical tree data structure, and wherein each of the plurality of first descendant nodes comprises a respective payload of the geospatial data and at least one reference to an address of a file having geospatial data in the memory,
wherein the hierarchical tree data structure is traversed and each node that has a respective payload that is determined to be drawable, is drawn by a renderer according to a map information request received from a client device, wherein the renderer determines a node to be drawable based on a comparison of a bounding box of the respective payload of the node to a view specification defining a viewable volume of the client device, wherein a node with a respective payload that is too coarse to draw is skipped by the renderer from being drawn, and wherein traversal of the hierarchical tree data structure stops when a node with a respective payload that is too fine to draw is encountered.

9. The non-transitory computer-readable medium of claim 8, wherein the plurality of nodes comprises a plurality of second descendant nodes, each of the plurality of second descendant nodes being a child node relative to one of the plurality of first descendant nodes in the hierarchical tree data structure and associated with one of a plurality of second geospatial sub-volumes, the plurality of second geospatial sub-volumes obtained by spatially partitioning the plurality of first geospatial sub-volumes along surfaces of constant altitude into a second plurality of strata.

10. The non-transitory computer-readable medium of claim 8, wherein the plurality of strata are defined such that one of the plurality of strata comprises geospatial data associated with a surface of the virtual globe.

11. The non-transitory computer-readable medium of claim 10, wherein the plurality of strata are defined such that no partitioning boundaries for the plurality of strata are located at the surface of the virtual globe.

12. The non-transitory computer-readable medium of claim 8, wherein each of the plurality of first descendant nodes has an address in the computer-readable medium assigned based at least in part on a strata associated with a first descendant node of the plurality of first descendant nodes.

13. The non-transitory computer-readable medium of claim 8, wherein the computer-readable medium is further encoded with a quadtree data structure.

14. The non-transitory computer-readable medium of claim 13, wherein first geospatial data objects are stored in the hierarchical tree data structure and second geospatial data objects are stored in the quadtree data structure.

15. The non-transitory computer-readable medium of claim 14, wherein the first geospatial data objects comprise imagery data objects for the virtual globe and the second geospatial data objects comprise terrain data objects or vector data objects for the virtual globe.

16. The non-transitory computer-readable medium of claim 8, wherein the respective payload of each node comprises data indicative of a longitudinal span of a first geospatial sub-volume associated with the node.

17. The non-transitory computer-readable medium of claim 8, wherein the respective payload of each node comprises data indicative of the bounding box for a first geospatial sub-volume associated with the node.

18. The non-transitory computer-readable medium of claim 8, wherein each node has a payload comprising data indicative of a bounding box for the geospatial volume associated with the node.

19. The non-transitory computer-readable medium of claim 8, wherein spatially partitioning the geospatial volume comprises recursively subdividing the geospatial volume into discrete geospatial sub-volumes along latitudinal, longitudinal, and altitudinal axes at each level in the hierarchical spatial partitioning scheme.

20. The computer-implemented method of claim 1, wherein spatially partitioning the geospatial volume comprises recursively subdividing the discrete geospatial volumes into discrete geospatial sub-volumes along latitudinal, longitudinal, and altitudinal axes at each level in the hierarchical spatial partitioning scheme.

* * * * *